United States Patent [19]

Provanzano et al.

[11] 4,307,447
[45] Dec. 22, 1981

[54] PROGRAMMABLE CONTROLLER

[75] Inventors: Salvatore R. Provanzano, Melrose; Wilbert H. Aldrich, Winchester, both of Mass.; Robert A. D'Angelo, Windham, N.H.; Emil P. Drottar, Ipswich, Mass.; John J. Finnegan, Jr., Hudson, N.H.; James Heom, Bedford, Mass.; Lawrence W. Hill, Arlington, Mass.; Ronald D. Malcolm, Andover, Mass.; Michael C. Nollet, Andover, Mass.; Baruch S. Perlman, Cambridge, Mass.; Michael B. Tressler, Tewksbury, Mass.; John E. VanSchalkwyk, Andover, Mass.; Kincade N. Webb, Cambridge, Mass.

[73] Assignee: Gould Inc., Rolling Meadows, Ill.

[21] Appl. No.: 49,895

[22] Filed: Jun. 19, 1979
(Under 37 CFR 1.47)

[51] Int. Cl.³ .............................................. G06F 7/00
[52] U.S. Cl. .................................................. 364/200
[58] Field of Search ... 364/200 MS File, 900 MS File

[56] References Cited

U.S. PATENT DOCUMENTS

| | | | |
|---|---|---|---|
| 3,898,626 | 8/1975 | Hutson et al. | 364/200 |
| 3,930,233 | 12/1975 | Morley et al. | 364/200 |
| 3,944,984 | 3/1976 | Morley et al. | 364/200 |
| 3,949,379 | 4/1976 | Ball | 364/200 |
| 3,965,459 | 6/1976 | Spencer et al. | 364/200 |
| 4,032,899 | 6/1977 | Jenny et al. | 364/200 |
| 4,077,058 | 2/1978 | Jacques et al. | 364/200 |
| 4,078,259 | 3/1978 | Soulsby et al. | 364/900 |
| 4,089,052 | 5/1978 | Gruner et al. | 364/200 |
| 4,096,565 | 6/1978 | Ruckdeschel et al. | 364/200 |
| 4,103,329 | 7/1978 | Davis et al. | 364/200 |
| 4,104,720 | 8/1978 | Gruner | 364/200 |
| 4,110,822 | 8/1978 | Porter et al. | 364/200 |
| 4,112,489 | 9/1978 | Wood | 364/200 |
| 4,190,885 | 2/1980 | Joyce et al. | 364/200 |
| 4,195,340 | 3/1980 | Joyce | 364/200 |
| 4,195,341 | 3/1980 | Joyce et al. | 364/200 |
| 4,195,342 | 3/1980 | Joyce et al. | 364/200 |
| 4,195,343 | 3/1980 | Joyce et al. | 364/200 |
| 4,197,580 | 4/1980 | Chang et al. | 364/200 |

FOREIGN PATENT DOCUMENTS 1077028 7/1967 United Kingdom .

OTHER PUBLICATIONS

G. Muething Jr., "Designing The Maximum Performance into Bit-Slice Minicomputers", 9/30/76, Electronics, vol. 49, No. 20, pp. 91–96.
J. Patel, "Pipelines with Internal Buffers", Conference Proceeding, 5th Annual Symposium on Computer Arch., Apr. 3-5, 1978, pp. 249–254 IEEE.

*Primary Examiner*—Gareth D. Shaw
*Assistant Examiner*—David Y. Eng
*Attorney, Agent, or Firm*—Mattern, Ware, Stoltz & Fressola

[57] ABSTRACT

An improved programmable controller having the ability to use two different data bases while presenting to the outside world a uniform word size. The programmable controller includes pipeline processing and hardware solution of a user control program in a network node format. A memory management scheme is provided allowing for the direct addressability of one-half million words by utilization of a page register. The programmable controller can be incorporated into a network containing other programmable controllers. The programmable controller also incorporates a multi-task interrupt so that the processor can handle more than one job at any particular time. Input/output tasks are handled logically in the scan solving the user networks rather than being based upon a particular physical area of the controller memory.

9 Claims, 24 Drawing Figures

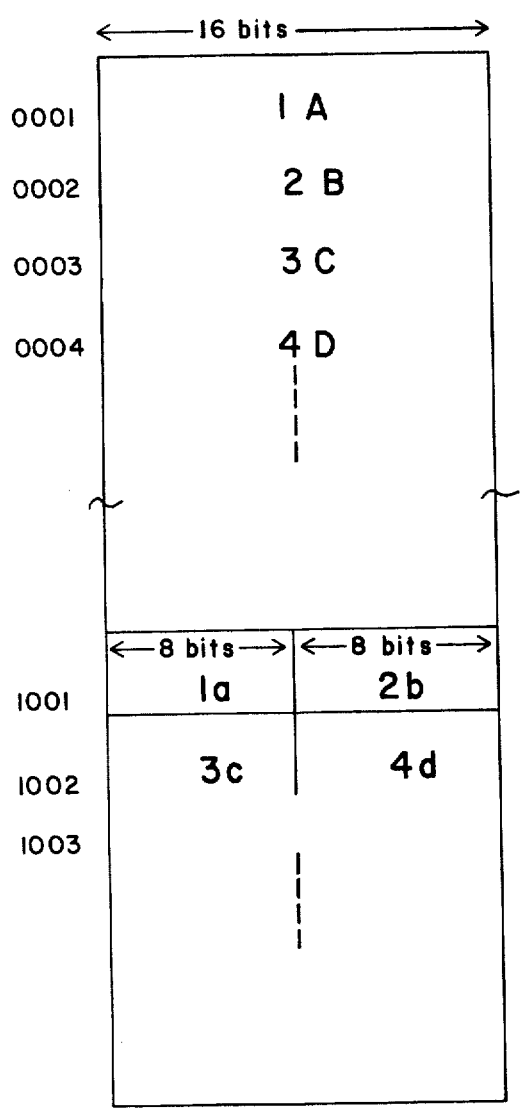
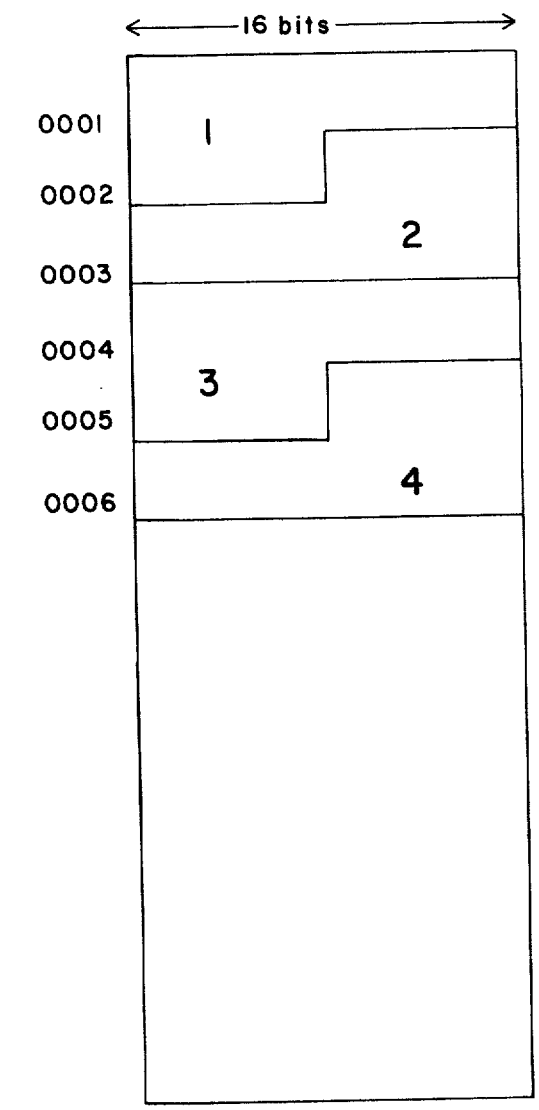
FIG. 3A
FIG. 3B

FIG. 5

| FIG. 5A | FIG 5B |
|---------|--------|
| FIG. 5C | FIG. 5D |
| FIG. 5E | FIG. 5F |

FIG. 6

| FIG. 6A | FIG. 6B |
|---------|---------|
| FIG. 6C | FIG. 6D |
| FIG. 6E | FIG. 6F |

FIG. 7

| FIG. 7A | FIG. 7B |
|---------|---------|
| FIG. 7C | FIG. 7D |
| FIG. 7E | |

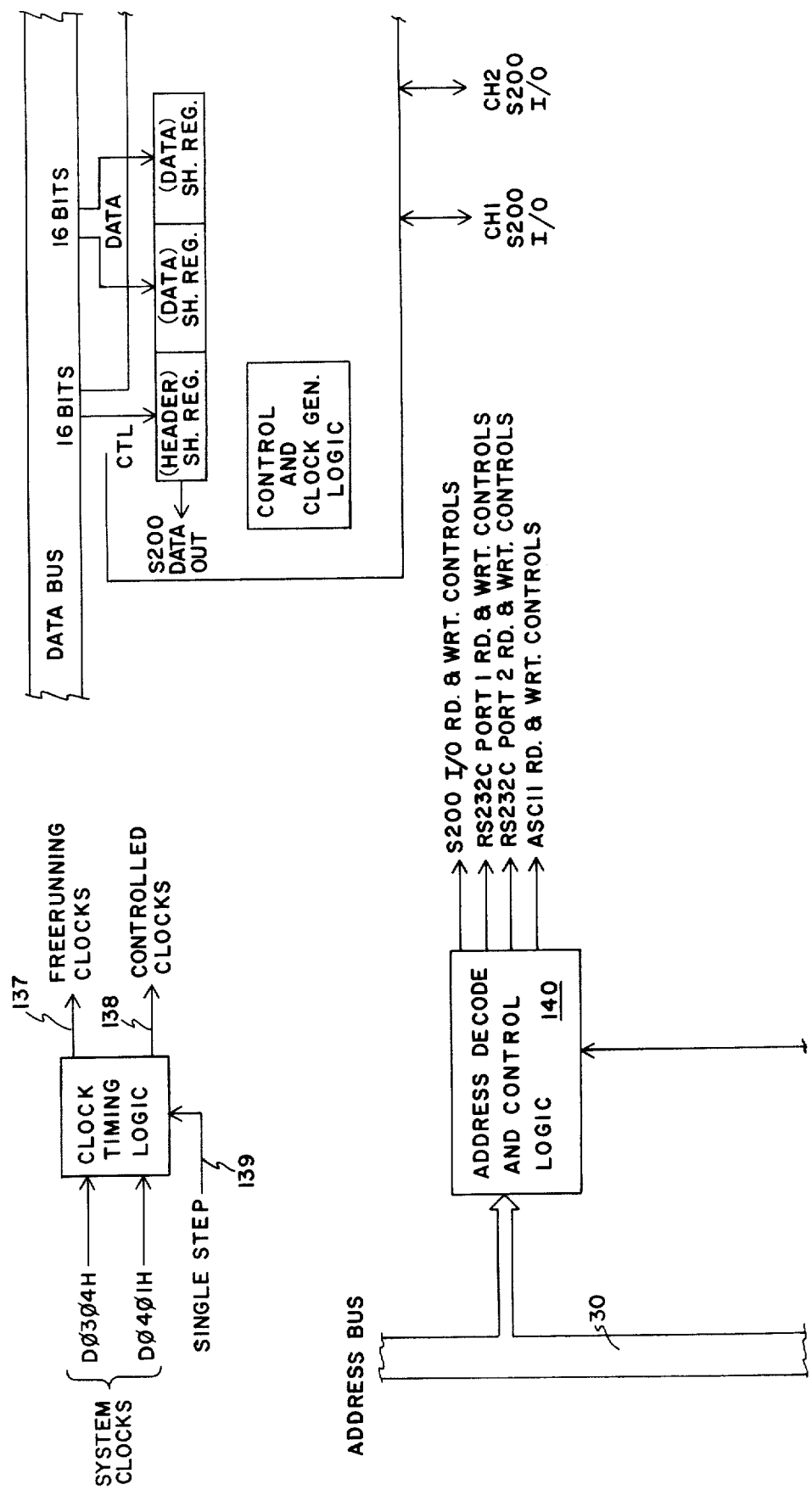

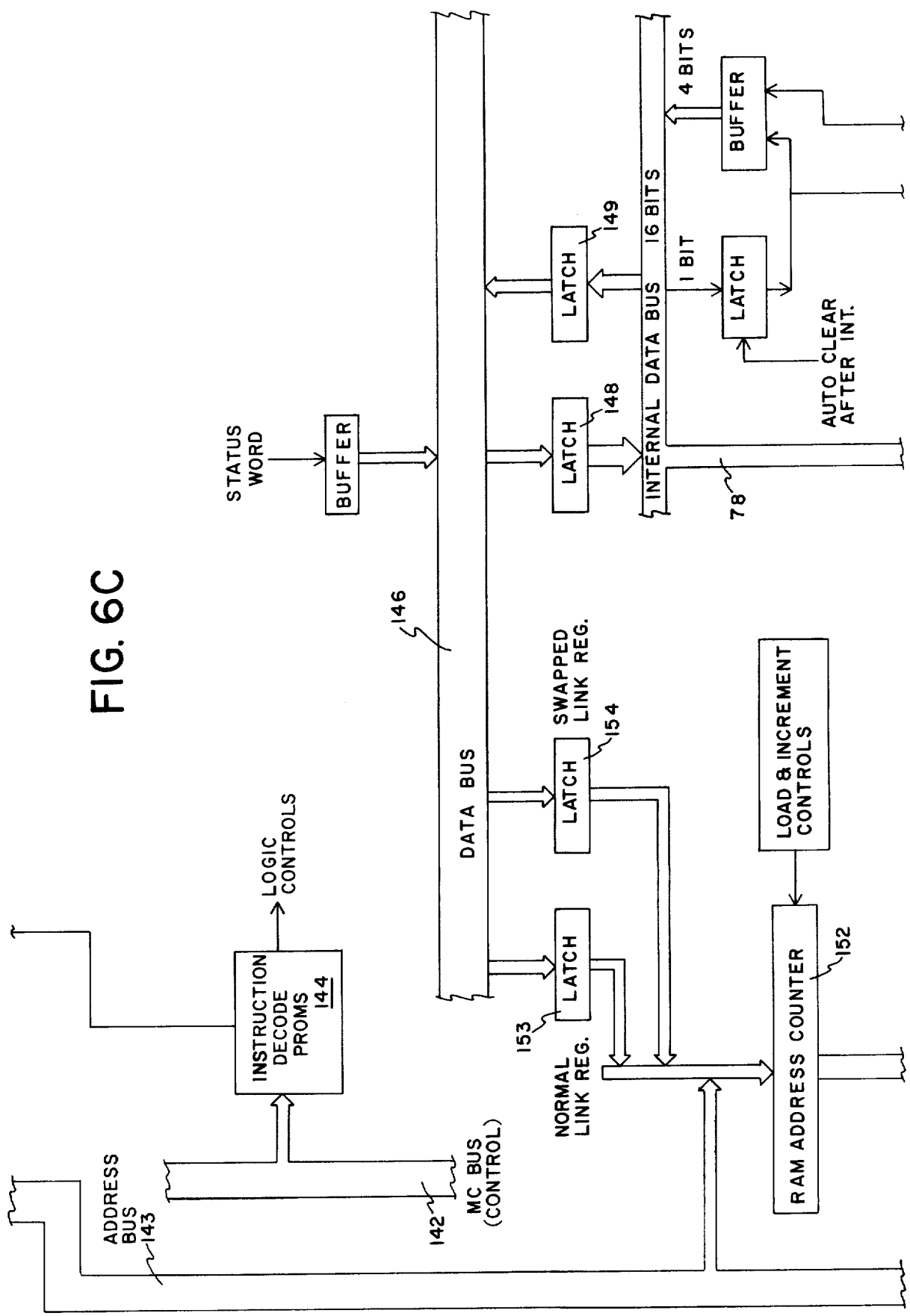

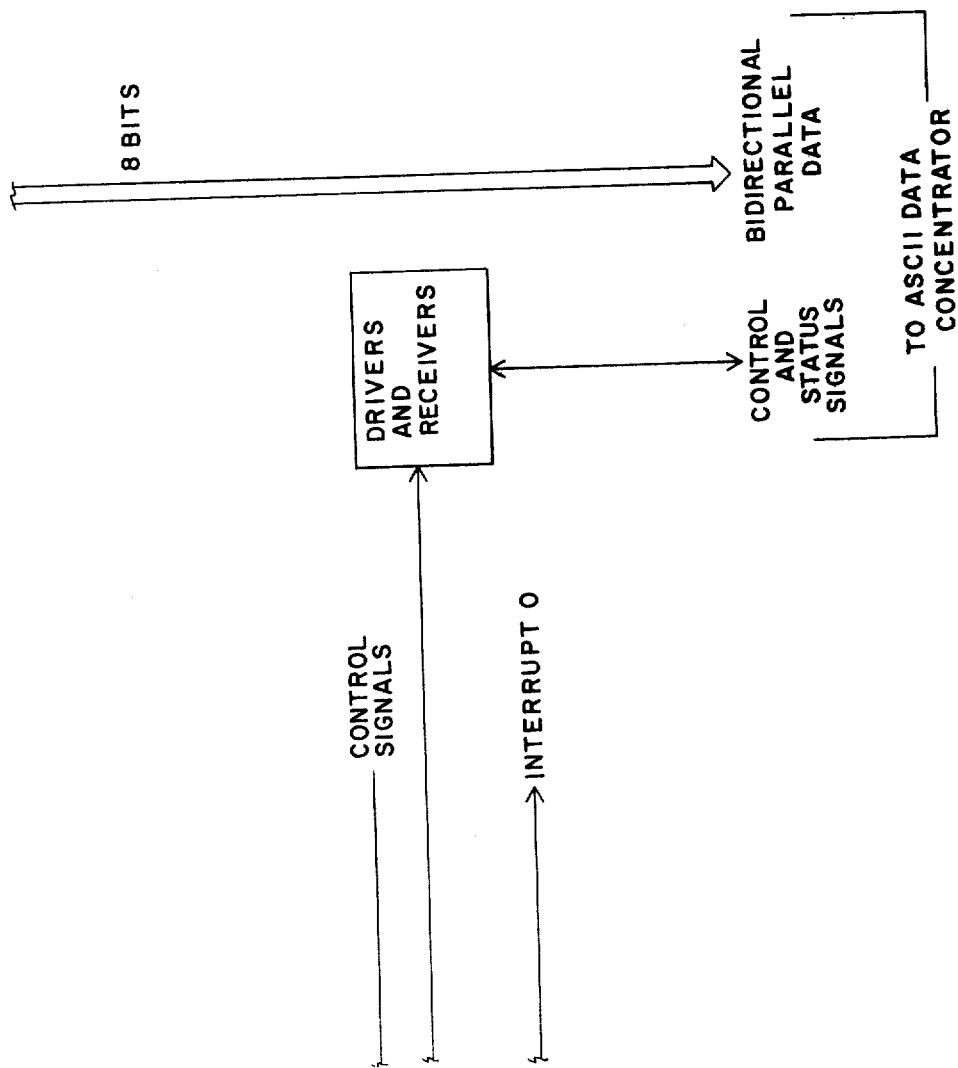

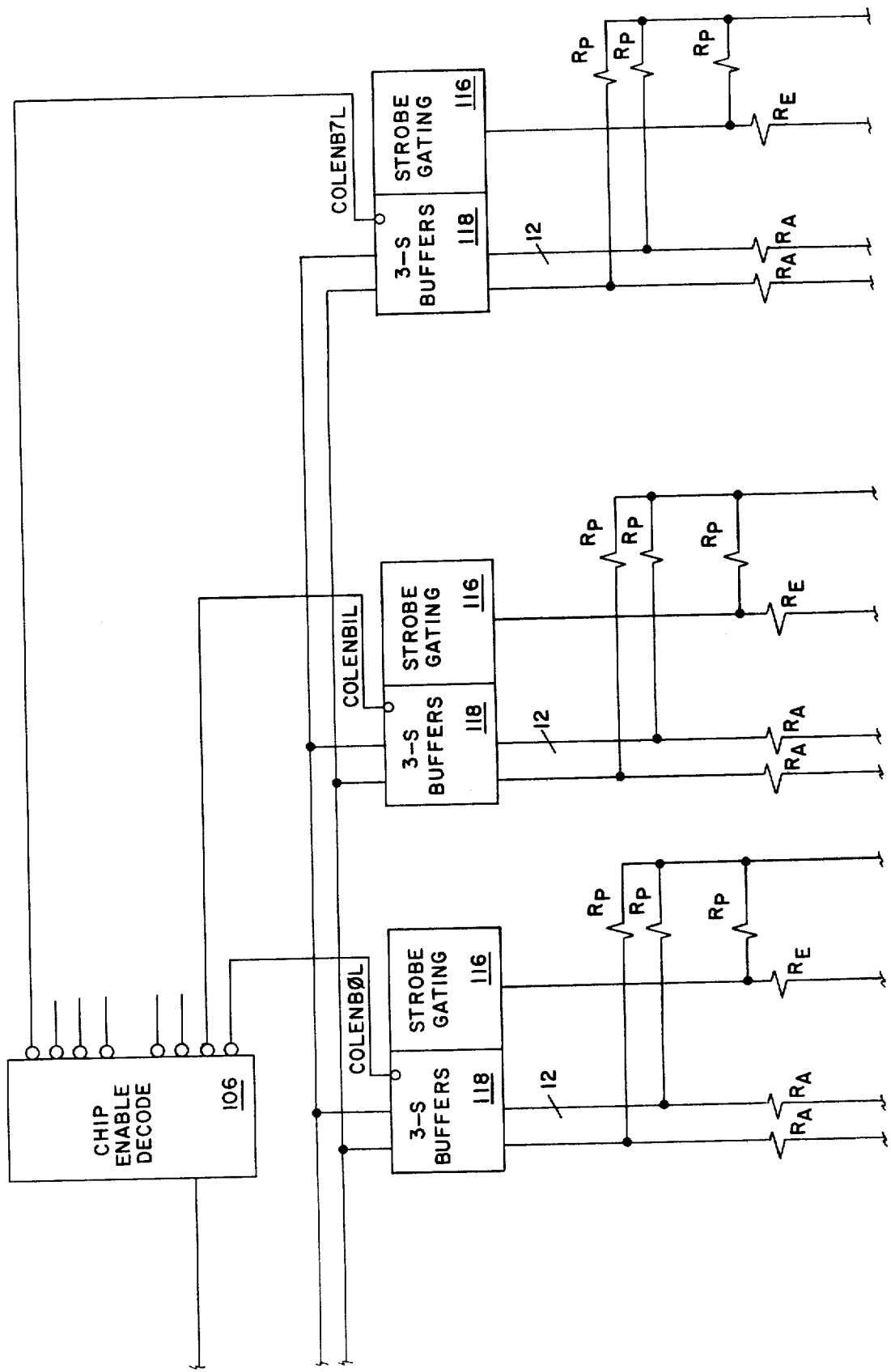

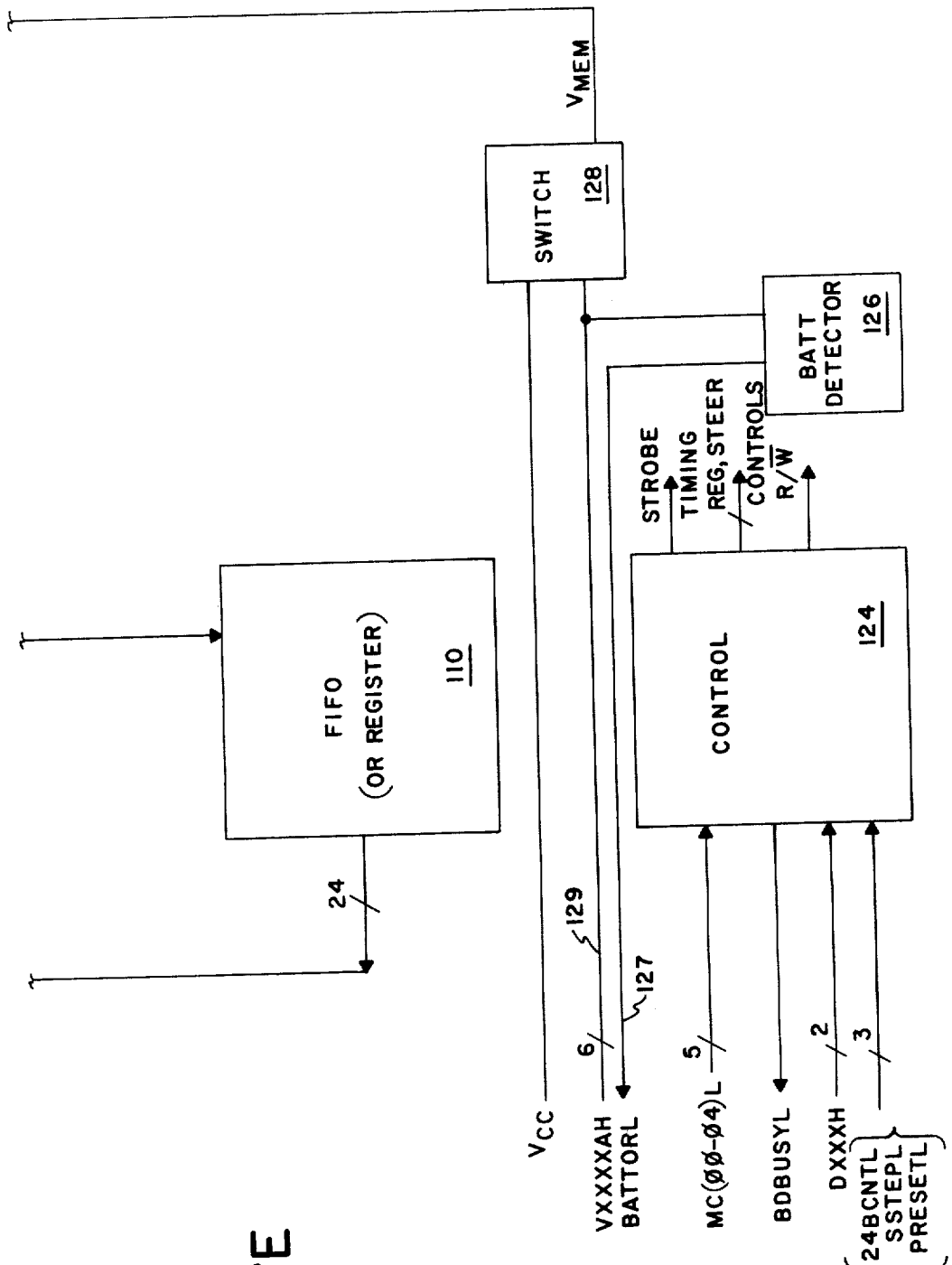

PROGRAMMABLE CONTROLLER

TECHNICAL FIELD

The present invention relates to programmable controllers and programmable controller systems.

BACKGROUND ART

The present invention is directed to programmable controllers typically used for control of industrial machines and processes which, since approximately 1969 when they were first developed, have been utilized to replace relay ladder-type logic previously used to achieve such control functions. U.S. Pat. Nos. 3,686,639, Fletcher et al, 3,994,984, Morley et al, 3,930,233, Morley et al, and U.S. patent application Ser. No. 895,581 filed Apr. 12, 1978 and assigned to the present assignee, illustrate the historical development of the programmable controller art. It is known that other patents have been issued to other companies manufacturing programmable controllers, including Allen-Bradley Co., Texas Instruments, and General Electric.

The present invention is an improvement over these prior art programmable controllers. It provides a dual data base capability with a unique data packing scheme while presenting a uniform word size to the external world and a user control hardware network logic solver utilizing a programmable logic array that allows the user to specify various node elements, including horizontal and vertical shorts. The processor hardware and software include a FIFO system to improve the memory throughput by taking advantage of the fact that the programmable controller solves network nodes in a sequential fashion. Two ports are provided to the memory including a random access port and the FIFO port. These features and a memory management system in which up to one-half million words can be directly addressed by a page register have not been previously utilized in the programmable controller art. Furthermore, the present invention performs input/output (I/O) logically throughout the scan solving the user networks rather than performing the I/O at a particular location in memory. Furthermore, a multi-phase clock system is utilized in the bus design to increase overall system speed.

These improvements yield a faster, more powerful and cost effective programmable controller than prior art controllers.

DISCLOSURE OF THE INVENTION

The present invention relates to an improved programmable controller which can form part of an overall programmable controller system. It has rapid solution of the user control program networks, a large user logic space, a large quantity of I/O, and a broad library of user functions. It can support 256 discrete inputs and 256 discrete output points which may be traded in blocks of 16 for register I/O. It can be expanded to 1,024 inputs and 1,024 outputs. Its scan time solving a 4,000 relay contact program is less than 40 milliseconds.

The basic system can be modularly upgraded to provide such additional functions as: (1) additional memory with a user space of at least 32,000 words, (2) the ability to directly address up to 64,000 references, (3) a remote I/O up to 5,000 feet from the mainframe central processing unit, and (4) the ability to support computer oriented functions including interrupt driven I/O, process control oriented user languages, mass storage, closely-coupled multiple CPU's and other peripherals.

The programmable controller utilizes hardware that can operate in two different data bases; namely, 16-bit and 24-bit, while all communications with the outside world utilize a uniform 24-bit format. A memory packing technique is able to efficiently store 24 bit data in a 16 bit memory. The bus design for intercommunication between the central processing unit, memory and I/O utilizes a multi-phase clock which forms two lines of a multi-line bus.

The programmable controller can operate in a pipeline format by utilizing a FIFO port with a cache memory to the main memory which takes advantage of the fact that the network nodes are solved in sequence. The FIFO cache memory resides between the main memory and the bus. It is sixty-four words deep and is able to be filled from the main memory at the memory cycle time of 750 nanoseconds. During times when the central processor unit (CPU) does not need access to memory (such as during the solution of a sixteen bit by sixteen bit multiply), the FIFO cache memory can continue its reading of sequential locations in memory. Then when access is requested by the CPU to memory, it can instead read data from the FIFO cache memory. Since the FIFO cache memory has a cycle time equal to the bus cycle time (250 nanoseconds), the CPU is not delayed in its processing by the slower main memory cycle time. This technique takes advantage of storing user control program network logic in sequential memory locations.

The programmable controller utilizes network format user control programs for specifying the control functions to be performed. The solution of the node types is performed in hardware forming the mainframe central processing unit. In this arrangement the speed for solving user networks is increased while providing great flexibility to the user with respect to designating his or her control program. The interconnectable programming panel is able to show the user any portion of the control program, allows the user to change or modify the control program, and is able to display the real time power node status of any selected node through use of a keyboard.

By a particular peripheral port protocol, the programmable controller can be interconnected to other programmable controllers which combine to form a control system.

The programmable controller also incorporates a multitask interrupt so as to allow the processor to perform more than one function at any particular time.

The overall result is a programmable controller with a fast solution time, flexible user implementation, and a relatively low cost.

THE DRAWINGS

For a fuller understanding of the nature and objects of the present invention, reference should be made to the following detailed description taken in conjunction with the following drawings, in which:

FIG. 3A is a diagrammatic representation of the packing of 24 bit data in a 16 bit memory;

FIG. 3B is a diagrammatic representation of a conventional prior art technique of packing 24 bits into a 16 bit word size memory;

FIG. 5 is a diagram showing how FIGS. 5A-5F are put together;

FIGS. 6A-6F are detailed block diagrams of the input/output processor;

FIG. 6 is a diagram showing how FIGS. 6A-6F are put together;

FIGS. 7A-7E are detailed block diagrams of the programmable controller memory;

FIG. 7 is a diagram showing how FIGS. 7A-7E are put together;

BEST MODE FOR CARRYING OUT THE INVENTION

Figure 1:
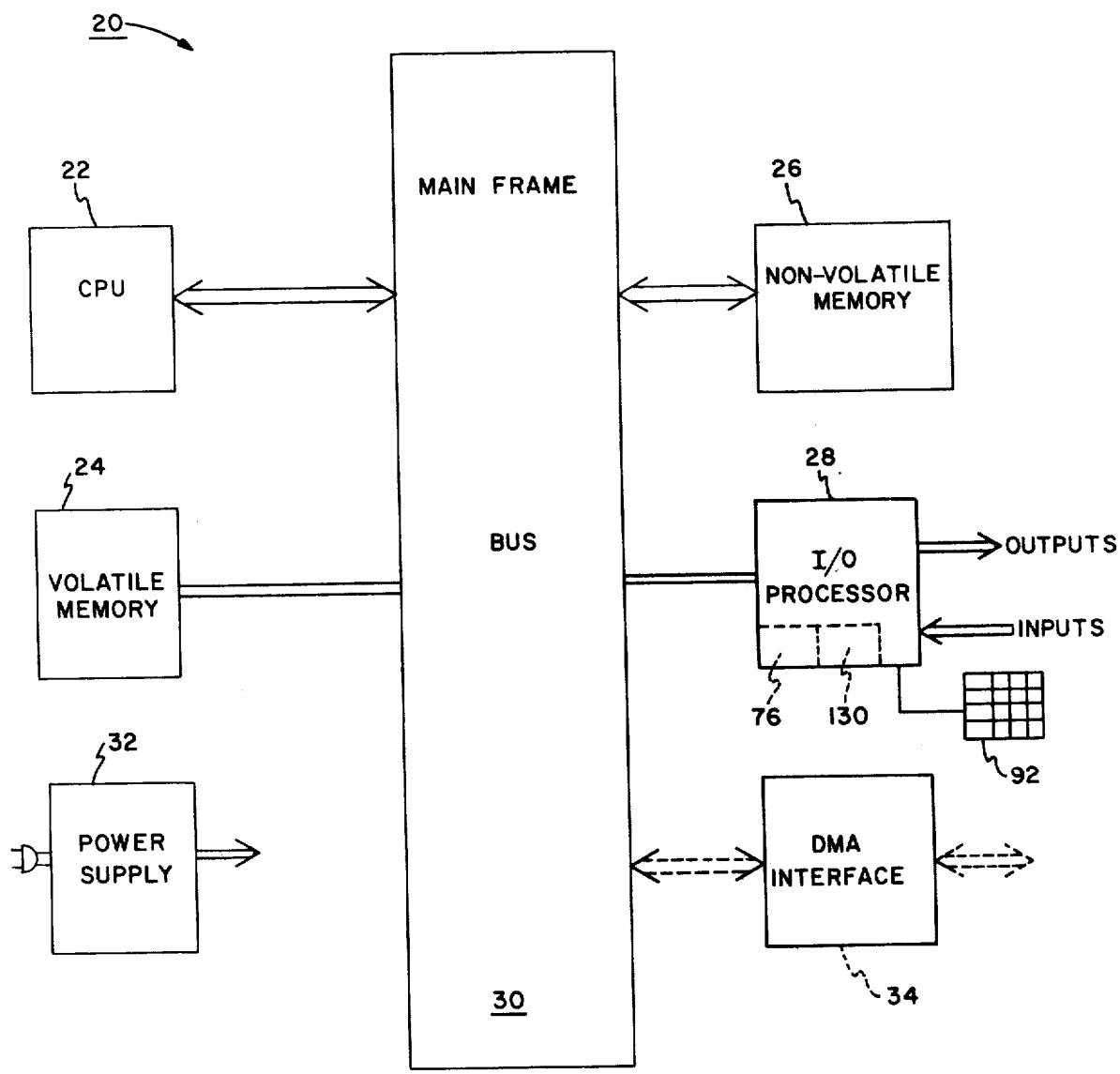
FIG. 1 is a block diagram of the programmable controller with interconnection to the input/output.

As shown in FIG. 1, an improved programmable controller 20 according to the present invention comprises a central processing unit 22, a main memory which may be a volatile memory 24 or a non-volatile memory 26, and an I/O processor 28 all intercommunicating with each other by means of a mainframe bus 30. A power supply 32 provides the necessary electrical current to drive the programmable controller components. A direct memory access (DMA) interface 34 may optionally be utilized for memory access without intercommunication with the CPU.

Figure 2:
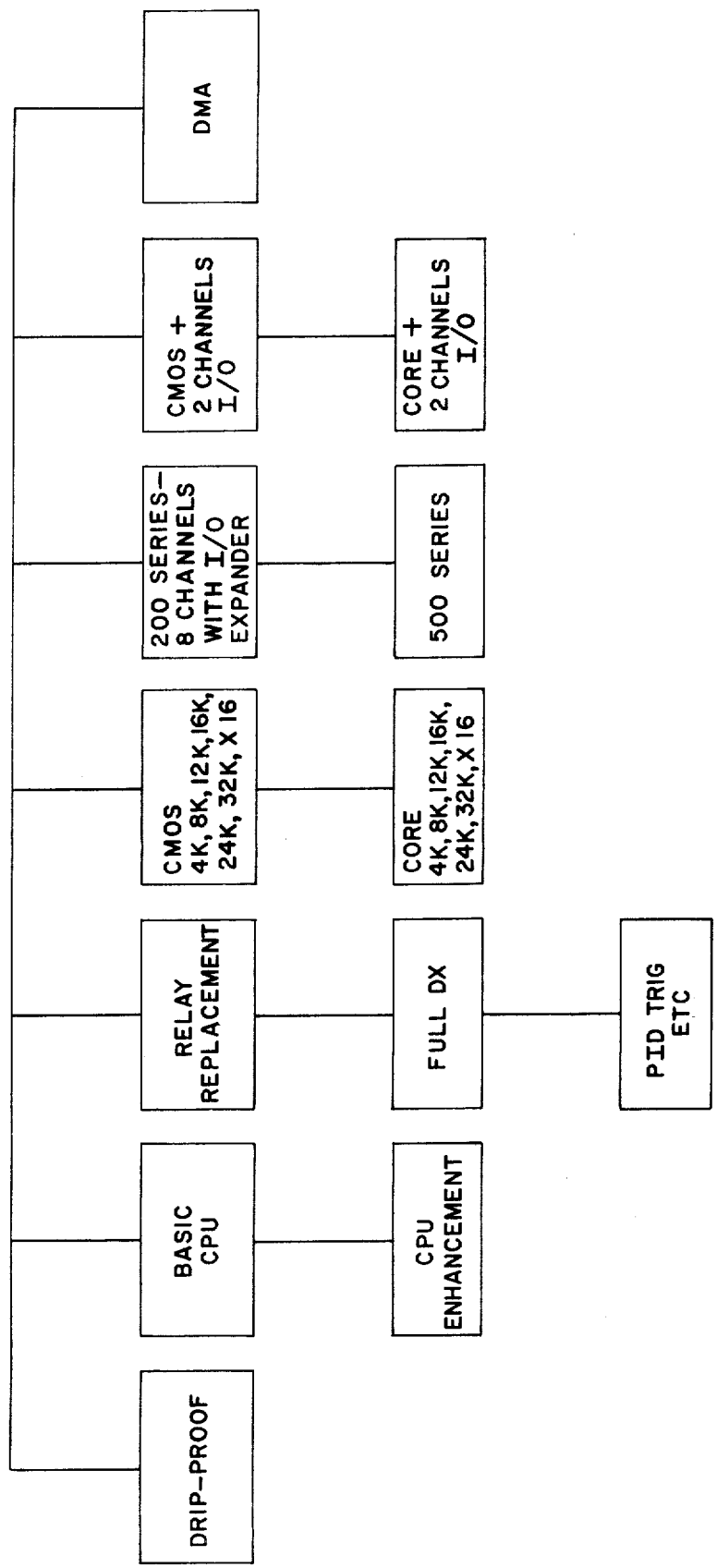
FIG. 2 is a diagrammatic illustration of the programmable controller system structure.

FIG. 2 is a diagrammatic representation of various aspects of the programmable controller system achievable by the present invention. As is shown diagrammatically in FIG. 2, the programmable controller is housed in a dripproof mechanical housing. The central processing unit can have enhanced capability and is able to replace conventional relays. It is able to perform DX functions; that is, functions of a non-relay logic nature such as a table-to-table move. It is able to perform such additional functions as a proportional integrator-differentiator (PID), trigonometric functions, etc.

The programmable controller comprises a main memory fabricated from CMOS and can have a size ranging from 4K by 16 bits up to 32K by 16 bits in general increments of 4K words. It can alternatively have a core memory, ranging in size from 4K by 16 bits up to 32K by 16 bits. The input/output (I/O) communicates on a protocol known as the 200 series, a series used by Modicon Corporation and described in their literature including that of their 384 ® Programmable Controller. The programmable controller also has a capability of direct memory access as also shown in FIG. 2. The power supply is able to drive the CMOS memory plus two channels of I/O. It can also power a core memory if such is used in the programmable controller and two channels of I/O.

Thus, the programmable controller shown in FIG. 1 provides a faster and functionally superior programmable controller system than the present assignee's 384 ® Programmable Controller, has a larger user logic space, a larger quantity of I/O and a broader library of user functions. It functions primarily as a relay replacer, has a 4K user memory expandable up to 32K words, can support 256 discrete inputs and 256 discrete output points which may be traded in blocks of 16 for register I/O and can be expanded up to 1024 input and 1024 output points. Its scan time solving a 4K relay contact user program is less than 40 milliseconds. It is housed in a rugged drip-proof package.

The programmable controller system can be modularly upgraded to provide the following additional characteristics:

(1) more user functions;

(2) additional memory up to a user space of at least 32,000 words;

(3) the ability to address up to 64K references and register-plus discrete locations;

(4) a faster scan time of 20 milliseconds;

(5) a remote I/O up to 5000 feet from the mainframe CPU;

(6) an interface to a communication link with other programmable controllers; and (7) the ability to support computer oriented functions including interrupt driven I/O, process control oriented user languages, mass storage, closely coupled multiple CPU's and other peripherals.

The basic package has a drip-proof housing designed so that the addition of more printed circuit boards can be obtained with a package having a similar appearance. The drip-proof housing has an upper and lower series of louvers to provide flow within the housing so as to cool the components on the various printed circuit cards placed within the housing.

A central processing unit (CPU) 22 shown in FIG. 1 is illustrated in greater detail in block diagrams FIGS. 5A-5F. A more thorough discussion of this block diagram is presented later.

The programmable controller has software functionality so as to perform relay replacement functions including normally open and normally closed contacts, horizontal and vertical shorts, and a user control network, counters and timers, and such additional non-logic functions as proportional integrator-differentiator, trigonometric functions, etc. The software comprises a minicode machine and a microcode machine. The minicode machine has the following major features:

(1) 8 general purpose registers, (2) 3 special purpose registers (Index, page A and B), (3) the capability of addressing 512K words of memory, and (4) a word of memory having 16 bits with two "node" types, 16 bits and 24 bits.

The minicode machine is able to word address so as to allow addressing 32K words per page. This allows for generation of a larger operation code set including new instructions beyond those of the Digital Corporation PDP-11 instruction set. The general design for the minicode word is 4 bits for an operation code and 12 bits for a source/destination addresses. This gives 16 major opcodes and 4096 source/destination address combinations. The 12-bit source/destination field is further broken up into two sections, with two 3-bit subsections including 3 bits for the source code, 3 bits for the source register, 3 bits for the destination code, and 3 bits for the destination register. The eight general purpose registers have the following utilizations:

(1) R$\phi$-R5 are general purpose registers, (2) R6 is used by hardware as a stack pointer for interrupt and subroutine call service and is referred to as SP, and (3) R7 is used by hardware as the program counter and is referred to as PC.

The three special purpose registers are the index register (IR), the page register A (PRA), and the page register B(PRB). The index register is a read/write via special instructions. It is used in addressing mode 5. The two page registers are also read/write via special instructions. They are used when an address (that is, used to find anything in memory) has a $\phi$ as its most significant bit. The contents of page register A are used as the four most significant bits (bits 18-15) of the address. When the address has 1 as its most significant bit, the contents of page register B are used as the four most significant bits (bits 18-15) of the address. This is a hardware feature that is independent of the addressing mode and the instruction.

The minicode operation code is built to be large in size and includes the instruction set given in Table 1 with their accompanying description. By use of this instruction set, a powerful programmable controller is realized.

The minicode machine described above thus uses a minicode executive which is the executive of the programmable controller. This executive amounts to a large loop with exception code for both power up and power down. The loop services I/0, solves user logic and handles peripheral port communications. Hardware interrupts for a real time clock (described later) watchdog timer failure (described later) and power down are serviced as well as a number of soft interrupts othertimes referred to a "traps".

Two major exceptions to the loop are power up and power down. The power up restores state tables, performs memory diagnostics, initializes coils, initializes peripheral port, and controls the executive through the first scan of I/O and logic solving.

Power down copies the state tables to a backup area, and does a check sum of the data contained in the state tables. The backup area uses a non-volatile memory (see FIG. 1).

TABLE 1

Mnemonic - RESET, Generic - reset
Description: The RESET instruction sends the controller
to its microcode power up routine. It resets all
logic and begins in microcode. It begins minicode
through the power up vector.
Mnemonic - WAIT, Generic - wait
Description: writes registers 0-15 into memory addresses,
checks for bus request and grants it if there. Then,
restores registers from same memory locations and
refetches the instruction at its location, and starts
all over again.
Mnemonic - JMP, Generic - jump
Description: Transfers control to any location in memory
with the full flexibility of the addressing modes
(with the exception mode 0). Mode 0 causes an illegal
instruction condition in the assembler. Modes 1-7
calculate the address of an operand. This address is
the value put into the PC.
Mnemonic - RTS, Generic - ReTurn from Subroutine
Description: First loads contents of register into the PC
and then pops the top element of the processor stack
into the specified register. Usually the register
used is the same one used in the original subroutine
call (i.e., if JSR PC then, RTS PC).
Mnemonic - NOP, Generic - No Operation
Mnemonic - SETC, Generic - condition code operators
Description: sets or clears condition codes according
to the information in the 4 LSB's.
Mnemonic - SWAB, Generic - swap byte
Description: Exchanges high order byte and low order byte
of operand specified by destination field.

TABLE 1-continued

Mnemonic - RNE, REQ, RPL, RMI, RVC, RSV, RCC, RCS,
Generic - Return from subroutine on condition
Mnemonic - SOB, Generic - subtract one and branch (if
not - 0)
Description: the register is decremented by one. If the
result Not = 0, then the offset is subtracted from
the current contents of PC 9 which will point to the word
following the SOB instruction) and the results put back
in the PC. NOTE that this means that this branch only
goes in one direction; back.
Mnemonic - JNE, JEQ, JPL, JMI, JVC, JVS, JCC, JCS,
Generic - Jump on condition
Mnemonic - CLR, Generic - clear destination
Description: contents of specified destination are
replaced with zero.
Mnemonic - COM, Generic - complement destination
Description: replaces the contents of the destination
with their one's complement (each bit that is a 0 is
set to a 1 and vice versa).
Mnemonic - INC, Generic - increment dst
Description: add one to the contents of the destination
and put back into the destination.
Mnemonic - DEC, Generic - decrement destination
Description: subtract one from contents of the destination
and put back into the destination.
Mnemonic - NEG, Generic - negate dst
Description: Replaces the contents of the destination
address with its two's complement.
Mnemonic - ADC, Generic - add carry
Description: adds the state of the carry flag (c) to the
contents of the destination address and puts result
back into this address. If C = 0, destination is
unaffected.
Mnemonic - SBC, Generic - subtract carry
Description: subtracts the state of the carry flag (c)
from the contents of the destination address and
puts back into this address. If C = 0, destination
is unaffected.
Mnemonic - TST, Generic - test dst
Description: sets the condition codes N and Z according
to the contents of the destination address.
Mnemonic - ROR, Generic - rotate right
Description: rotate all bits of destination right one
place through the carry.
Mnemonic - ROL, Generic - rotate left
Description: rotate all bits of destination left one
place through carry.
Mnemonic - ASR, Generic - arithmetic shift right
Description: shift all bits of destination right one
place: bit 16 is replicated and bit 0 goes into
the carry.
Mnemonic - ASL, Generic - arithmetic shift left
Description: shifts all bits of destination left one
place: bit zero is loaded with a zero.
Mnemonic - MFCR, Generic - move from condition register
Description: the four system condition flags plus a
variety of system states are loaded into the destination
address.
Mnemonic - MTCR, Generic - move to condition register
Description: four least significant bits of the contents
of the source address are loaded into the condition
register. Memory protect and "config" are not affected
as they are read only.
Mnemonic - SXT, Generic - sign extend
Description: if the sign flag (N) is set, a −1 is put in
the destination address. If the sign flag is clear,
then destination address is cleared. This is useful
in multiple precision arithmetic because it permits
the sign to be extended through multiple words.
Mnemonic - JSR, Generic - jump to subroutine
Description: the contents of the register are pushed into
the processor stack, the PC is then put into the
specified register (the PC will point to the instruction
following the JSR), and finally executes similar to a
JMP instruction. This means that modes 1-7 can be used
in the destination. Mode 0 should cause an illegal
instruction error in the assembler.
A common use of this instruction involves TABLE 1-continued specifying the PC as the register (JSR PC, dst).
This will result in PC → stack and dst → PC.
Return from subroutine is performed by the RTS PC
instruction.
Mnemonic - MOV, Generic - move source to destination
Description: the source operand is placed in the destination
address. Previous contents of destination are lost.
The contents of the source address are not affected.
Mnemonic - MOVM, Generic - move under mask
Description: The source operand is logically ANDed with a
mask, the destination operand is logically ANDed with
the inverse of the mask, and the two are logically
ORed to obtain a result. This result is placed in the
destination address. The contents of the source address
are not affected, the contents of the destination
address are destroyed. Note: this instruction takes
2-4 words. The mask is always the first word after
the instruction.
Mnemonic - CMP, Generic - compare src to dst
Description: compares the source and destination operands by
subtracting the dest. from the source. Its function is
to set condition flags. The contents of the source
and destination addresses are unaffected.
Mnemonic - CMPM, Generic - compare under mask
Description: The source and destination operands are logically
ANDed with a mask before being compared. The compare
is done by subtracting the modified dest. operand from
the modified source operand. The result is used to
set/clear condition codes. The contents of the source
and destination addresses are NOT affected. The mask
always resides in the first word following the
instruction.
Mnemonic - BIT, Generic - bit test
Description: The source operand is logically ANDed with the
destination operand and the condition codes are
modified appropriately. The contents of the source
and destination operands are not affected.
Mnemonic - OR, Generic - logical or (bit set)
Description: The source operand is logically OR'd with the
destination operand and the result is placed back into
the destination address. The contents of the source
address are not affected but the original contents of
the destination address are destroyed.
Mnemonic - ADD, Generic - add src to dst
Description: Adds the source operand to the destination
operand and puts the result into the destination
address. The contents of the source address are not
affected, but the original contents of the destination
address are lost.
Mnemonic - BNE, BEQ, BPL, BMJ, BUC, BUS, BCC, BCS, BR,
BGE, BGI, BLE, BLT, BAI, BLOS, BMPROT,
Generic - branch on condition
Description: provides a way of transferring program control
within a range of −128 to +127 words.
Mnemonic - SUB, Generic - subtract src from dst
Description: subtracts source operand from destination
operand and puts the result into the destination
address. The contents of the source address are not
affected but the original contents of the destination
address are destroyed.
Mnemonic - XOR, Generic - exclusive or
Description: the exclusive OR of the source operand and
the destination operand is put into the destination
address. The contents of the source address are not
affected, but the original contents of the destination
address are lost.
Mnemonic - AND, Generic - logical AND
Description: the logical AND of the source operand and the
destination operand is put in the destination address.
The contents of the source address are not affected,
but the original contents of the destination address
are destroyed.
Mnemonic - MBLK, Generic - move block
Description: R0 is defined to contain the # of words to
be moved. This instruction performs the so called
COBOL move. The block of words starting at the source
address is moved to become a block of the same size
starting at the destination address. This instruction
will move the source block intact regardless of the
direction of the move. If the source address is less
than the destination address, the move will be performed
from the bottom of the source block to the bottom of
the new destination block. If the source address is
greater than the destination address, the move will be
from the top of the source block to the top of the
destination block. This keeps any information from
being destroyed in the transition. NOTE that R0 is
not changed, and that the source and destination
registers change only according to the node. Example:
MBLK (R2), (R3) will leave R2 and R3 unchanged.
"MBLK" will be interruptible during its execution.
Mnemonic - ROTL, ROTR, LGL, LGR, Generic - Rotate/Shift
specials
Description: Destination operand is rotated or shifted by
the # of bits in the count. If the count = 0, then the
contents of R0 are the count. R0 remains unchanged at
the completion of the instruction, if it held the count.
Only the 4 LSB's of R0 will be used, the 12 MSB's will
be ignored.
Mnemonic - MUL, Generic - single precision multiply
(two's complement)
Description: A 2's complement multiply is performed between
the source operand and the contents of the register and
the result is placed in the register. The contents of
the source address are not affected. The original con-
tents of the register are lost and the register is
filled with the LSB's of the result.
    The assembler must block any register greater
than R5.
Mnemonic - DIV, Generic - single precision divide (2's
complement)
Description: A two's complement divide is performed between
the source operand and the contents of the register
and the results are placed in the register. The
remainder is neglected. The contents of the source
address are unaffected; the original contents of
the register are lost.
    The assembler block uses any register greater
than R5.
Mnemonic - ASH, Generic - arithmetic shift
Description: register is shifted as a function of the
information in (src). Meaningful contents of source
range from −32 to +31 (0 means no action). If
source contains a +4, the register is arithmetically
shifted 4 bits to the left: if −4, it would be shifted
4 bits to the right.
Mnemonic - ASHC, Generic - arithmetic shift combined
Description: the contents of the register and the register
plus one are used for a 32 bit shift, according to
information in source. Meaningful contents of the
source range from +31 to −32 (0 means no action).
If source contains a +4, the 32 bit register pair
is shifted 4 bits to the left. A −4 would shift
to the right.
Mnemonic - ADWC, Generic - add with carry
Description: The source operand is added to the contents
of the register and the carry flag (0 or 1) and the
result put into the reg. The contents of the source
address is not affected; the original contents of the
register are lost.
Mnemonic - SBWC, Generic - subtract with carry
Description: the source operand is subtracted from the
contents of the register and the carry flag (0 or 1)
is subtracted; the result is put in the register.
The contents of the source address are Note affected.
The original contents of the register are lost.
    This instruction adds carry to permit multiple
precision (i.e. multiple registers) subtraction.
Mnemonic - DMUL, Generic - double precision multiply
(2's complement)
Description: A 2's complement multiply is performed
between the source operand and the contents of
register, and the double precision result is put into
this register and the one immediately following it.
For example, if R3 were specified, the MS word of
the result would be placed in R3 and the LS word in
R4. The contents of the source address are not
affected. The original contents of Rn and Rn + 1
are lost.

TABLE 1-continued

The assembler must block any register greater
than R4.
Mnemonic - DDIV, Generic - double precision divide
Description: A 2's complement divide is performed in
which the contents of the register (MS) and the
one immediately following it (LS) are divided by the
source operand. The results are placed in the register
(quotient) and in the one immediately following it
(remainder). The contents of the source address and
the source address plus one are not affected. The
contents of the register (Rn) and the one immediately
following it (Rn+1) are lost.

The assembler must block any register greater
than R4.
Mnemonic - SOLV, Generic - solve logic
Description: This solves the user logic data base. Must
be set up with a FIDO command.

The SOLV instruction will solve the nodes of
one segment, up to but not including the EOS/EOL
node which marks the end of segment. (The minicode
will drive the I/O thru separate instructions; MAPIN &
MAPOUT). The SOLV must be explicitly executed for each
segment in the database.

Furthermore, SOLV will terminate (return to
minicode) at 16 different PC locations, based upon
the 4 least significant bits of reference portion
of the EOS/EOL node.

The SOLV instruction will have 16 possible vectored
exits, calculated from the vector index in the EOS/EOL
node. The 4 bit index will be added to the (updated)
PC, and the SOLV will vector to the address within
"PC+1-index." Index = 0 will mean "EOL".

In all cases, the EOS/EOL reference bits will
be returned in register R1 (16 l.s. bits).
Mnemonic - MOVNOD, Generic - move nodes
Description: MOVNOD is a specialized instruction. It
expects R0 to contain a count of the number of
nodes to move (1-32K). It expects the source
address to be in R4, and the destination address to be
in R5. It also requires that the source and destination
addresses be correctly set up for overlapping moves.

If the src < adr dst adr (R4 < R5), the addresses
will be decremented used for inserting nodes).

If the src addr > dst addr (R4 > R5), the addresses
will be incremented (used for deleting nodes).

When the move is done, R4 and R5 will be updated
to point beyond the last node moved. That is; (R4) ±
(R0) → R4; (R5) ± (R0) → R5. R0 is unchanged.
Mnemonic - RTMI, RTMO, RTSV, Generic - return to MAPIN
return to MAPOUT, return to SOLV
Description: minicode routines are needed to perform
general user logic nodes or traffic cop types that
are not done in microcode. These routines must be
concluded an RTMI, RTMO, RTSV instr.
Mnemonic - FIDO, Generic - FIFO load
Description: the source operand is provided to the user
logic FIFO as the starting address of user logic.
The FIFO will start to fill from this address.
This command must be given prior to a SOLV instr.,
preferably far enough in advance to permit the FIFO
to fill.
Mnemonic - RDNOD, Generic - read a node
Description: RDNOD always gets 24 bit node, whether
the database is 16 bits or 24 bits. The microcode
uses the "config" line to determine how it will process
the node. For the 24 bit configuration, the node is
supplied as is. For the 16 bit configuration, it is
"expanded". R0 gets the 8 bit node type in the low
8 bits and R1 gets 16 bit reference address.

The assembler will block use of R0, R1 and/or
mode 0 in the destination specification.
Mnemonic - WRNOD, Generic - write a node
Description: WRNOD always expects a 24 bit node where:
R0 (15-8) = 0; R0 (7-0) = 8-bit node type;
R1 (15-0) = 16-bit reference number. Then, the
microcode uses the "config" line to determine how it
will process the node. For the 24 bit configuration,
the node is written at the destination address as is,
using the special logic which packs a node away in
memory. For the 16 bit configuration, the microcode

TABLE 1-continued

"implodes" the node. Then the resulting bits are
written to memory at the destination address.

The assembler will block use of R0, R1 and/or
mode 0 destination specification.
Mnemonic - LDWIDG, Generic - load 'widget' register
Description: The 'widget' register is a special register
in the 24-bit node type memory. This is the register
which the hardware uses to pull the node type byte
out of the user area for concatenation with the 16 bit
reference number. It is loaded with a value equal to:
(base addr of user logic)/2 + (total # of nodes possible).

The "base addr of user logic" must be an even
number.
Mnemonic - CLRINT, Generic - clear all pending interrupts
Description: initializes the interrupt controller such
that any pending interrupt requests are erased and
all eight interrupts are enabled.
Mnemonic - EI, Generic - enable interrupts
Description: All interrupts are globally enabled.
Mnemonic - DI, Generic - disable interrupts
Description: All interrupts are globally disabled.
Mnemonic - RTI, Generic - return from interrupt
Description: used to exit from an interrupt (one of the
ones reserved for minicode use - see CLRINT) or a
software trap routine. The PC and condition code
register are restored from the system stack.
Mnemonic - SPR, RPR, Generic - set/read page registers
Description: SPR (set page registers) this instruction
sets page registers A & B according to the values
in "source". Src bits 7–4 go to page reg A and
src bits 3–0 go to page reg B.

RPR (read page registers) this instruction
reads page registers A & B into "destination".
Page reg A goes to dst bits 7-4 and page reg B
goes to dst bits 3–0. (Dst bits 15–8 are set zero).
Mnemonic - RDKEY, Generic - read the keypad
Description: This instruction reads one keystroke into
destination, if available. If there is no keystroke
available, the m.s. bit (bit 15) is set to 1; the rest
are unpredictable. If there is a keystroke, the m.s.
bit is set to zero and the four l.s. bits (bits 3–0) are
set as follows:
0 = zero; 1 = one; 2 = two; 3 = three;
4 = four; 5 = five; 6 = six; 7 = seven;
8 = eight; 9 = nine; A = address;
B = contents
Mnemonic - WRLED, Generic - write an LED digit
Description: The LED is a decimal/hex display; that is,
it can be written with 0–9; A–F only. The l.s.
byte of the source controls the digit, its position,
and the decimal point. The bits control the 6-digit
LED display as follows:
Bit 7: decimal point (0 = none; 1 = dec'l on)
Bits 6–3: digit itself (0–9; A–F)
Bits 2–0: digit "address"; 0 = l.s. digit;
5 = m.s. digit.
Mnemonic - CTBCD, Generic - convert to/from BCD
Description: the destination operand is converted to/from
BCD and replaced in the destination address.
Mnemonic - FASCII, Generic - convert to/from ASCII
Description:
Mnemonic Operation
TASCII Convert contents of R0 to ASCII,
put into (dst), (dst+1)
FASCII Convert 4 ASCII characters residing
in (dst), (dst+1) to binary and
put into R0
Mnemonic - PUSHR, Generic < — > push R0 - R5 selectively
onto system stack
Mnemonic - POPR, Generic < — > pop R0 - R5 selectively
from system stack
Mnemonic - STRAP, Generic - software trap
Description: this generates a software trap. The old PC
and condition code register are pushed onto the stack.
The number NN (0 to 77) is additionally pushed onto
the stack for use by the software trap handler.
Mnemonic - MTIR, MFIR, Generic - move to/from index register
Description: MTIR moves the source operand to the Index
Register.

TABLE 1-continued

MFIR moves the contents of the Index Register into the destination address.

Mnemonic - ADIR, SBIR, Generic - add/subtract nn to/from Index register

Description: The value NN (bits 5-0 of instr) is either added to or subtracted from the contents of the Index register and the result put back in the Index register. The original contents of the Index register are lost.

Mnemonic - MAPIN, General - map inputs into CPU

Description: MAPIN will move ("map") 8 words from a buffer (R1) to the state ram (coils and registers) according to the traffic cop (R0).

R0 has the address of 8 words of the traffic cop for this map-in operation. R1 has the address of 8 words of the I/O buffer with the data.

At the end of the MAPIN instruction, the values in R0 & R1 will each have been increased by 8. The values in R2-R5 will have been destroyed.

Mnemonic - MAPOUT, Generic - map outputs from CPU

Description: MAPOUT will move ("map") 8 words from the state ram (coils and registers) to a buffer, according to the traffic cop.

R0 has the address of 8 words of the traffic cop for this mapout operation.

R1 has the address of 8 words of the I/O buffer which will receive the output data.

At the end of the MAPOUT instruction, the values in R0 & R1 will each have been increased by 8. The values in R2-R5 will have been destroyed.

Mnemonic - STRTIO, Generic - start the field I/O

Description: This instruction starts the exchange of I/O between the I/O RAM buffers and the physical I/O. The I/O process will continue on its own (in the microcode) once this instruction has been executed.

Mnemonic - WDTENB, Generic - watchdog timer enable

Description: This instruction sets the "enable watchdog timer" flag in the microcode. Thus, when SOLV sees EOL, it can then "kick" the wdt if enabled.

Mnemonic - CRC16, Generic - cyclic redundancy check

Description: CRC16 calculates a CRC-16. The data is packed one byte per word with the upper byte zero. The starting address is placed in R0, the byte count in R1. The CRC-16 result (a 16-bit value) will be in R2 upon completion of the instruction.

Mnemonic - PUNT, Generic - power unquestionably not there

Description: moves a block of memory from State RAM adr; state RAM adr + count−1. Adds each word moved to the current checksum.

---

Errors within the loop cause the programmable controller to enter the "STOP" state in which logic and I/O are not performed but peripheral port functions are performed. This allows the STOP machine to be open to the outside world for both examination and remedy if possible.

Expansion of the executive is possible though new code types, I/O types and total or partial override of the executive.

The first expansion level is achieved by using existing tables or vector addresses to exit to codes that can handle such things as new node types (non-microcode node vector) or I/O type (after traffic cop) or even after the vector addition of hardware interrupts.

Power-up is the first minicode routine executed by the programmable controller when power comes on. It stores tables saved during power-down (tables which normally reside in volatile memory, see FIG. 1), performs initial diagnostics, initializes coils (including a first pass of input), solves the first scan and does first pass of output control and then goes to the main loop. Power-up is basically used to initialize the organization of the programmable controller for later operation.

The next operation of the minicode executive is to read all inputs twice. This allows the printed circuit input cards of the Series 200 I/O to "warm up". It is basically a precaution to insure that transients have settled. The second read is used as the actual data.

The next executive operation is to solve all logic as set forth by the user control program.

The following step of the minicode executive is to perform all I/O twice. This allows the printed circuit output cards of the Series 200 I/O to "warm up", and brings "fresh" inputs for the next sweep to utilize.

Other operations of the minicode executive include clearing the first pass flag and the end of the power-up. In addition, the minicode executive has a "widget" register and a 24-bit node storage. A widget register is a hardware device which gives the programmable controller the ability to store and retrieve 24 bits from a 16-bit memory.

FIGS. 3A and 3B respectively illustrate the present invention and the prior art. They are a comparison of memory packing techniques utilized in the prior art and the present invention for packing 24 bits into a 16-bit word size memory. As is readily apparent in FIG. 3A, for any 24-bit word (such as word No. 1), the first 16 bits of that word (the least significant 16 bits) are stored in a first memory address (such as address 0001) with the eight remaining bits (the most significant bits), stored in a memory address positioned from the first memory address by a given number of locations (such as 1,000); and thus, at memory location 1001. Only 8 of the 16 bits of location 1001 are used for word No. 1. For the second 24-bit word, the first 16 bits of the word are stored in memory location 0002 with the remaining eight bits of that word stored in memory location 1001, in that memory locations eight least significant bits. As is readily apparent from FIG. 3A, this provides a neat manner for packing a 24-bit word into a 16-bit memory. The alternative method shown in the prior art would be to store the 24 bits of the first word in the first 24 bits of memory; that is, 16 bits in memory location 0001 with the eight remaining bits in memory location 0002. Then for the second 24-bit word to be stored in memory would be first presented to the eight remaining bits of memory location 0002 with the remaining 16 bits of word No. 2 stored in memory location 0003. The present invention's memory packing technique is easier to utilize since there is a one-to-one correspondence between the memory and the data to be stored with only the remaining bits of the data to be stored packed into additional memory locations having a fixed space from the former memory address location. Each word of data is thus stored at the beginning of a memory location unlike the prior art where, depending upon the data, it is even stored as a first bit of a memory address location or the ninth bit of the memory address location.

The widget register is thus the hardware device that gives the programmable controller the ability to store and retrieve 24-bit nodes in a 16 bit memory. This register is loaded with a special "value" to enable it to perform its function. It also requires that the data base area be organized so that the area reserved for user logic holds two nodes for each three words available. Furthermore, the nodes are stored as shown in FIG. 3A. The 24-bit node is divided into eight bits (the most significant eight) and sixteen bits (the least significant). They are shown in FIG. 3A as "aA", "bB", "cC", "dD", where "a" is the most significant eight bits and "A" and the corresponding least significant sixteen bits. There is one further rule needed to make the widget system work and that is that the "base addR" must be an even number. Although the maximum number of nodes "N" may be odd or even for a given user logic, for clarity sake the executive always has an even total number of nodes. Thus the widget register must be loaded with a value from the following equation:

$$\text{widget register} = [(\text{base addR}) \div 2] + N,$$

where "N" is the total number possible user nodes, not the total amount of user logic words "area". The widget register is always loaded at power up regardless of the configuration of the programmable controller; that is whether it utilizes a sixteen bit memory or a twenty-four bit memory.

The main loop is the center of operations after the power up is completed. Through it logic is solved, I/O performed, diagnostics performed, peripheral port commands executed, and major housekeeping performed.

The exits from the main loop are interrupts of both a "hard" and "soft" nature. In most cases return is made to the main loop. Other exits can occur in the peripheral port command handler section. The main loop checks for a "STOP" state. If there is not a "STOP" state, the logic is solved and I/O performed. At the end of a scan of the user networks, the peripheral port commands are executed. Diagnostics (logic check sum, etc.) are also performed. After, if there still is no "STOP" state, I/O is completed. By doing peripheral port and diagnostics first, time is given for the I/O to finish any transactions. Then the clocks are updated (real time clocks settings for timer nodes, not needed if in "STOPPED" state.). Finally, regardless of the "STOP" state, the key pad and display lights of the programmable controller are updated.

Another function of the minicode executive is the peripheral port command handler. The peripheral port command handler is used to act upon commands/requests received at either one of two peripheral ports. The basic function of the peripheral port is to supply programming (for user logic and data) and monitoring (of register coils, status, etc.).

The peripheral ports are interrupt driven. The peripheral port handlers exist in microcode (discussed later). When data is coming in from an outside device, the interrupt handler for that port buffers the data. Output interrupts occur when the port is ready to transmit, in which case, data in the transmit buffer is sent. Although there are two peripheral ports there is only one command handler.

Another function of the minicode executive is interrupt handlers and traps. The interrupt handlers are used to process interrupts. The actions involved depend on the type of interrupt. There are two categories of interrupts, "hard" and "soft". "Hard" interrupts are the type generated (originally) by the hardware. These interrupts are, real time clock, watch dog timer failure, peripheral port one, peripheral port two, and power down.

"Soft" interrupts are the type which are generated solely by the microcode software. These are software trap, illegal minicode instruction, illegal traffic cop item, microcode fatal error, and non-microcode node type. As is evident, these interrupts are used as an escape for things the microcode is not intended to handle.

In order to perform the minicode executive through the minicode machine the programmable controller incorporates a microcode which performs the basis of operation for the central processing unit (see FIG. 1). The microcode routines are of three general types: (1) those that perform (or aid in performing) the minicode instruction set, (2) those that execute (or aid in executing) user logic instructions, and (3) those that perform other necessary system functions such as service interrupts, system I/O, etc.

The microcode represents the basic level of awareness in the programmable controller. There is a basic set of routines that can be entered in response to external events (interrupts). These routines fall into two areas: those that perform a background function for the minicode (discrete I/O, plus request, etc.) and those that rely on a sequence of minicode instructions to perform a function.

The rest of the microcode routines perform functions that are indicated by information in memory (instructions). Each of these routines perform its function and, through use of the program counter (for minicode instructions), or the USER LOGIC FIFO (used for logic instructions, discussed later) jump to another routine to perform another function.

The routines that perform minicode instructions call the next routine by fetching the contents of the memory word indicated by the program counter and putting this word into the instruction register. Through the use of a MAPPING ROM and a programmable logic array (PLA), this results in (1) addresses of the next microcode routine, and (2) the addresses (if any) of the source and destination code microcode routines becoming available (as long as this information is in the instruction register). A jump is made to the address provided by the MAPPING PLA of the next routine. The new routine utilizes the source and destination code routines (if appropriate) to find operands in memory.

The routines that perform user logic instructions call the next routine through the use of a "PIPELINE" command. Basically it results in information being taken from the user logic FIFO and loaded into a "link register" specified by the routine. Through use of another "MAPPING ROM", the address of the next routine is made available. The link register is used in order to insure that additional information (operand) is immediately available upon entering the routine to perform another user logic instruction.

Interrupts are handled by an interrupt controller. When one occurs, a flag is set. The above mentioned routines deal with this flag differently. In minicode and user logic instruction fetch routines test for this flag. Additionally, any microcode routine that takes longer than 50 microseconds also tests this flag. This serves to minimize interrupt response time.

When a routine senses the interrupt flag, it jumps to a routine that gives the appropriate commands to the interrupt controller so that the address of the interrupt handling routine is provided to this routine by the MAPPING ROM. This routine then jumps to this address.

The function and description of the microcode modules is set forth below:

(A) Basic Instruction Design

There are three types of minicode instructions, a single word instruction, a single operand instruction, and a double operand instruction.

The single word instruction routine performs its function without using the source/destination code routines to obtain operands. The operands for these instructions are either implicit in the instruction (contained in the defined location or register), part of the instruction (as in the offset contained in a branch instruction) or not necessary at all.

(B) Utility Models

A utility model is a microcode module that performs a service or function and is written in a way that can be utilized by multiple microcode modules. It is similar to a sub-routine, except that entry to and exit from it are not by standard JSR and RTS.

(C) Microcode Library Routines

Library routines are microcode sub-routines that perform services or functions that are used by more than one module. They are entered with a JSR and returned via an RTS. In most cases they are standard 2911 commands with the return address on the 2911 stack. In the situation where the library routine may be long in time, a different technique is used. In these latter situations the routine that is calling the library module puts a return code on the microcode memory stack. It will then jump to the module. The library module performs its task and returns by retrieving the return code from the microcode memory stack and jumping to the RETURN portion of the RTI module. This insures safe return to the calling module.

(D) Connections Between Microcode Modules

There are six pages in the 1.5K microcode system. Modules are assigned to these pages as set forth below:

| | |
|---|---|
| Page 0 | Minicode instruction modules where MS bit of the instruction machine code is equal to 0, power up routine |
| Page 1 | Minicode instruction modules where the MS bit of the machine code equals 1 |
| Page 2 | FETCH, source/destination routines, interrupt routines, user logic modules, etc. |
| Page 3 | MAPIN, MAPOUT, STRT I/O, I/OHAHA, BCD-BIN, BIN-BCD. |
| Page 4 | Peripheral part handlers, basic user logic modules, same minicode instructions modules, CRC16 |
| Page 5 | User logic modules |

Figure 5A:
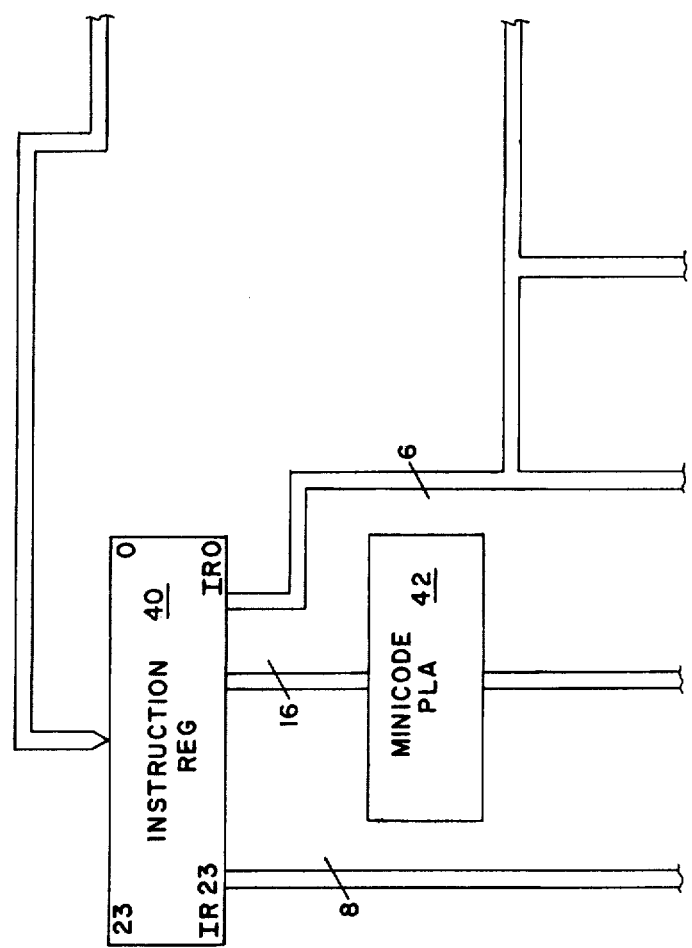
FIGS. 5A-5F are detailed block diagrams of the central processing unit.
Figure 5A:
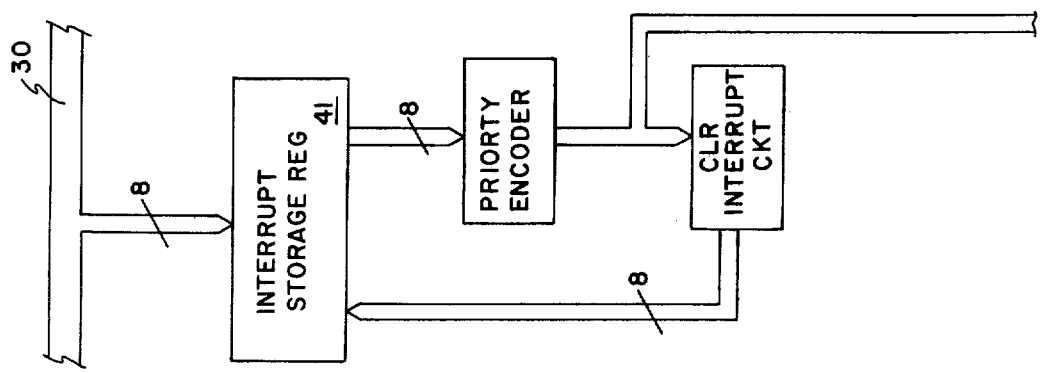
Figure 5B:
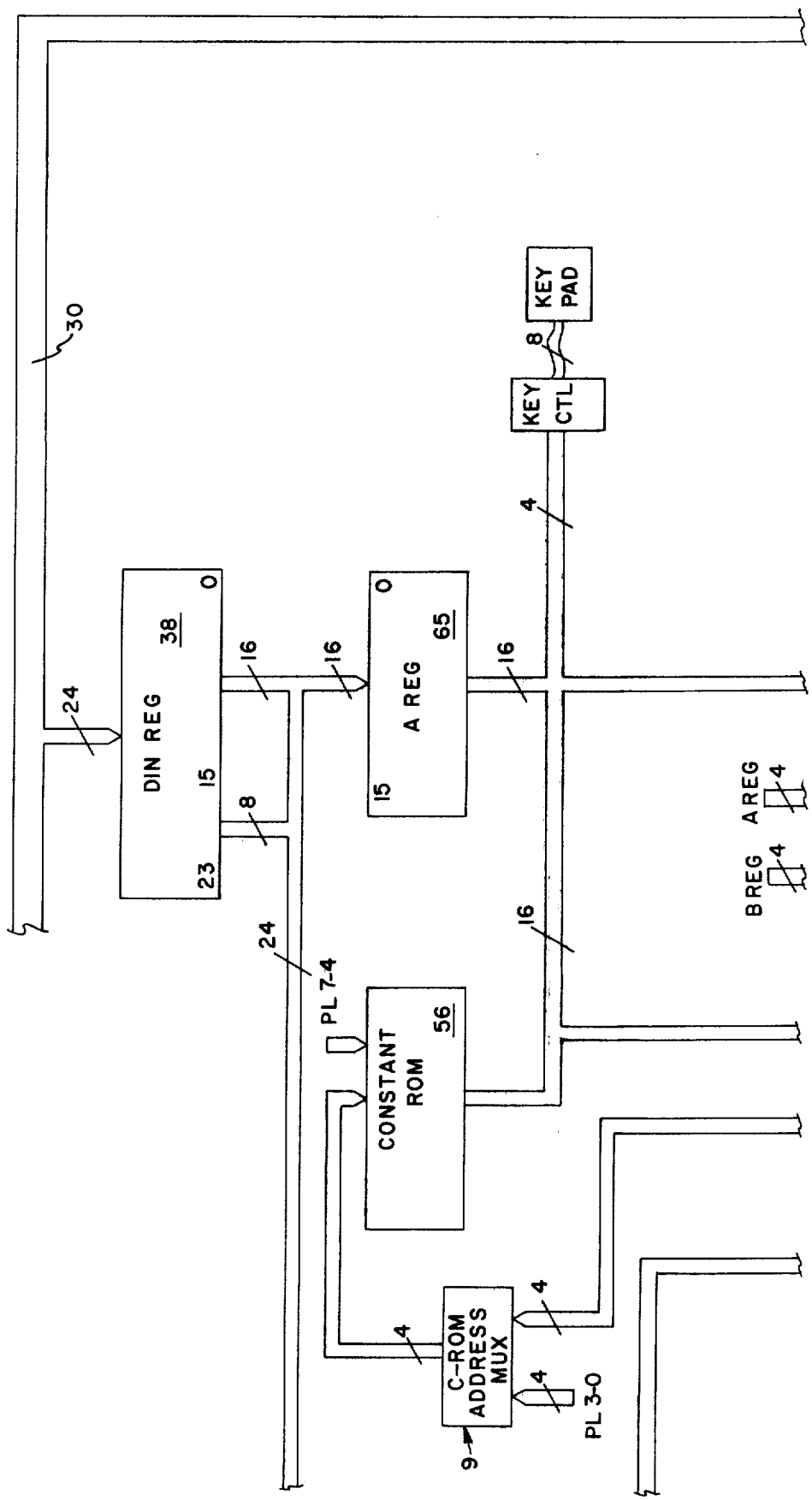
Figure 5C:
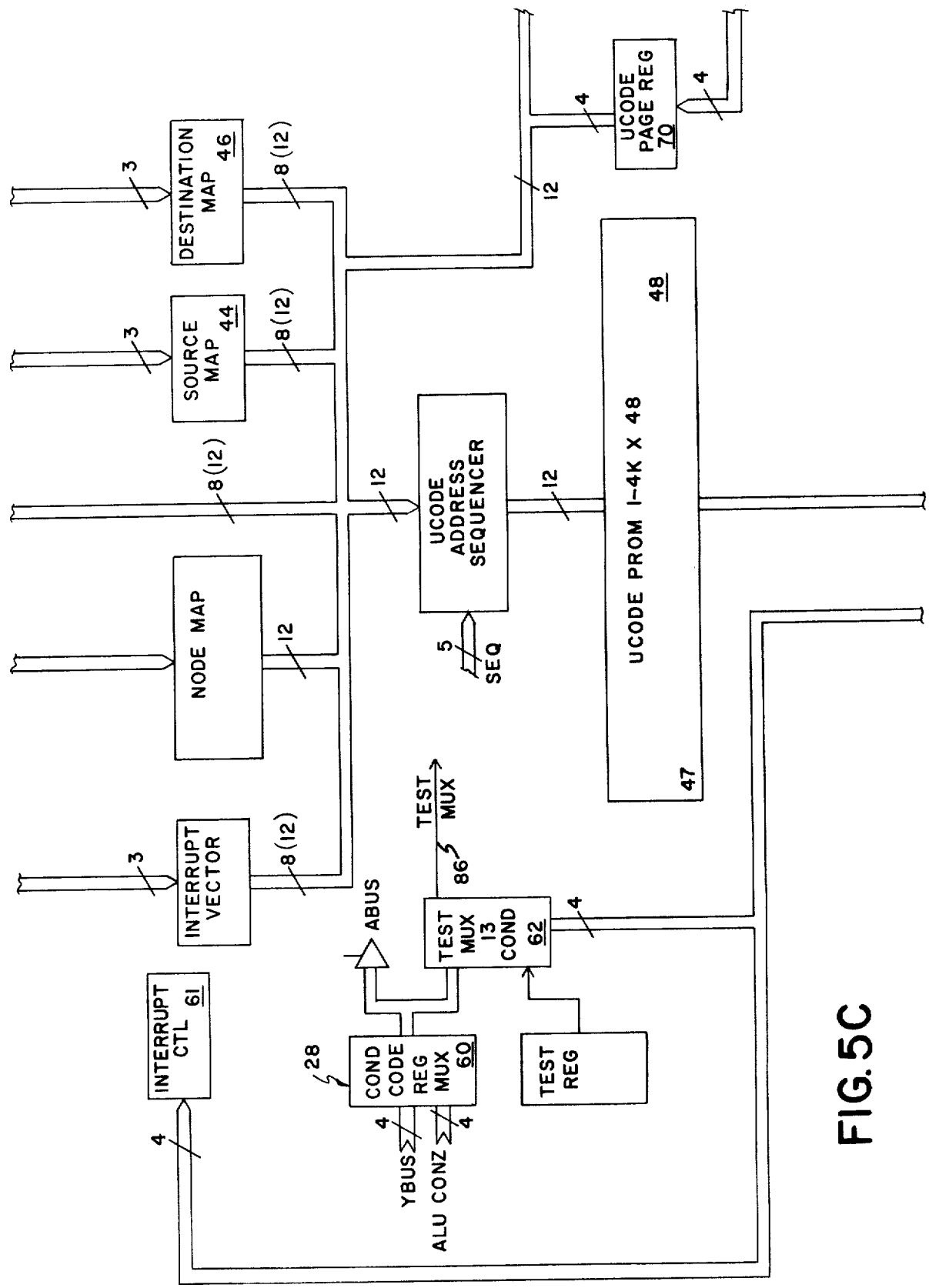
Figure 5D:
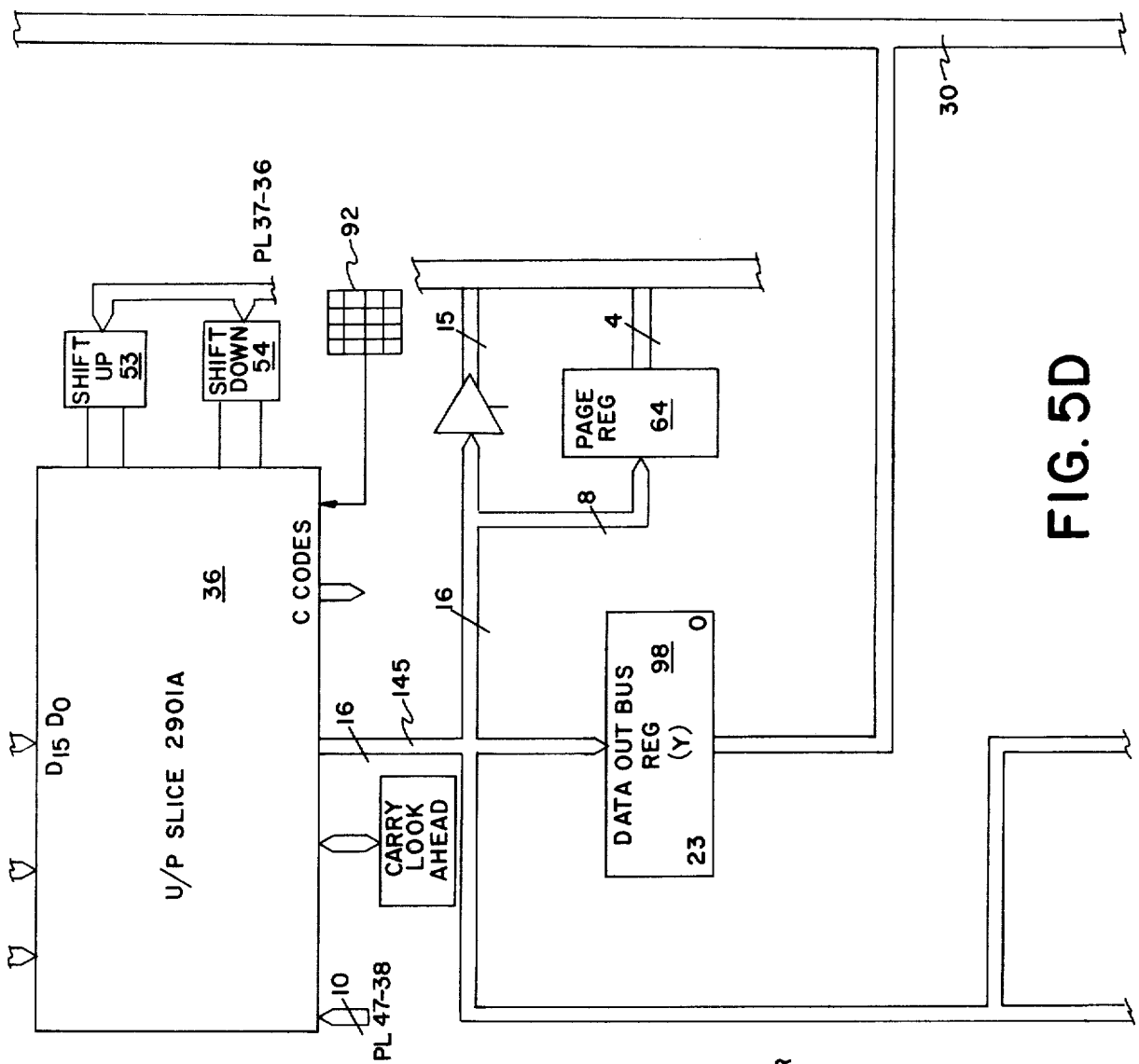
Figure 5D:
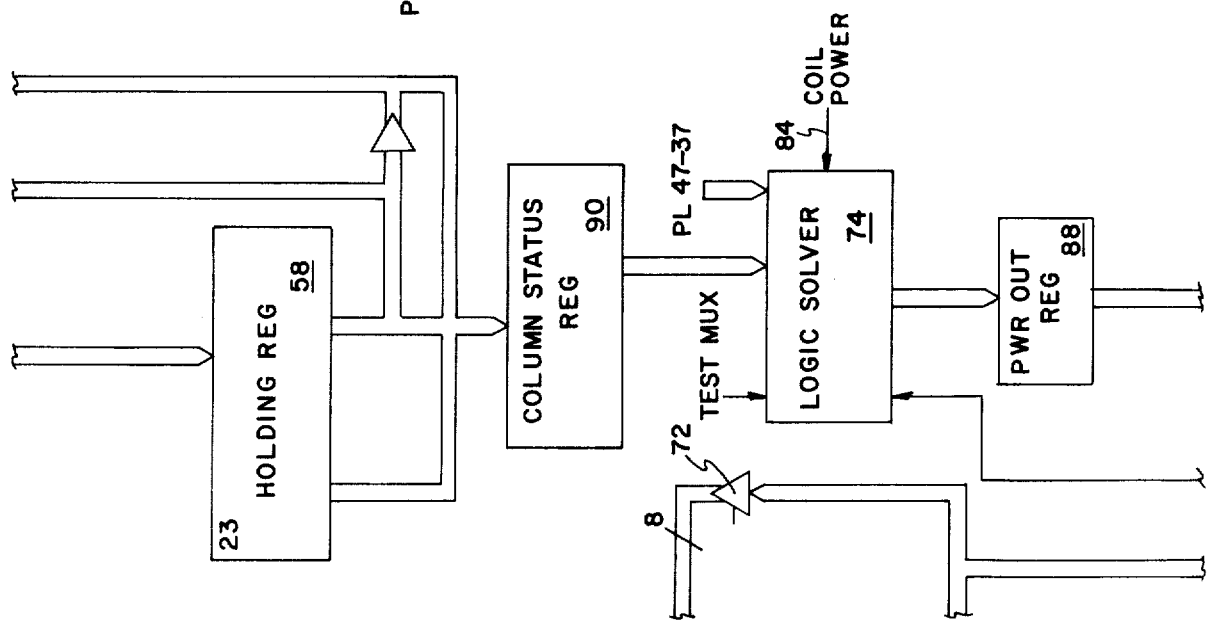

The programmable controller microprogram executive is performed by the microprogrammed central processing unit which incorporates a 2901A microprocessor slice arithmetic logic unit 36 as seen in FIG. 5D. The microcomputer incorporates an Advanced Micro Devices, AMD 2900 family of components as set forth in FIGS. 5A-5F. Reference should be made to the Advance Micro Devices' "Family Data Book" as well as the Signetic's Micro "Assembler Reference Manual".

The microprogram and minicomputer comprising the central processing unit 22 can be viewed in two ways: (1) From a minicomputer side it is a minicomputer with an instruction set having special instructions for logic solving. The basic word is sixteen bits, the user logic can be either in a 16-bit or 24-bit format and can be handled in special ways by the memory interface hardware; (2) From the microcomputer side, it is a collection of special processor chips, or logic that acts like special processor chips, and other internal functions which enable it to perform the minicode and special functions.

Microcode Processor

There are several specialized processes (and blocks of logic that act as processors) which, together, create the microcode machine. They are (1) AMD 2901; this is a 4-bit slice arithmetic logic unit. Four are used to create the basic arithmetic/logic unit (ALU) 36 of the CPU 22. Also, the 4-bit slice performs logical shifts and contains seventeen internal general purpose registers.

AMD 2911

This is also a 4-bit slice. Three are used to create a microcode address sequence control capable of addressing up to a 4K microcode memory. It also controls selection of the next address in the microcode memory. It contains an internal register, a program counter and four element stacks.

Interrupt Control 61 (FIG. 5C)

This block of logic can be instructed to ENABLE, DISABLE, and CLEAR all or CLEAR one interrupt.

CPU Control

This logic controls the bus registers and other special purpose registers surrounding the AMD 2901. It is a catchall area; anything outside of 2901 but inside the busses that is not controlled elsewhere, is controlled here.

Figure 5E:
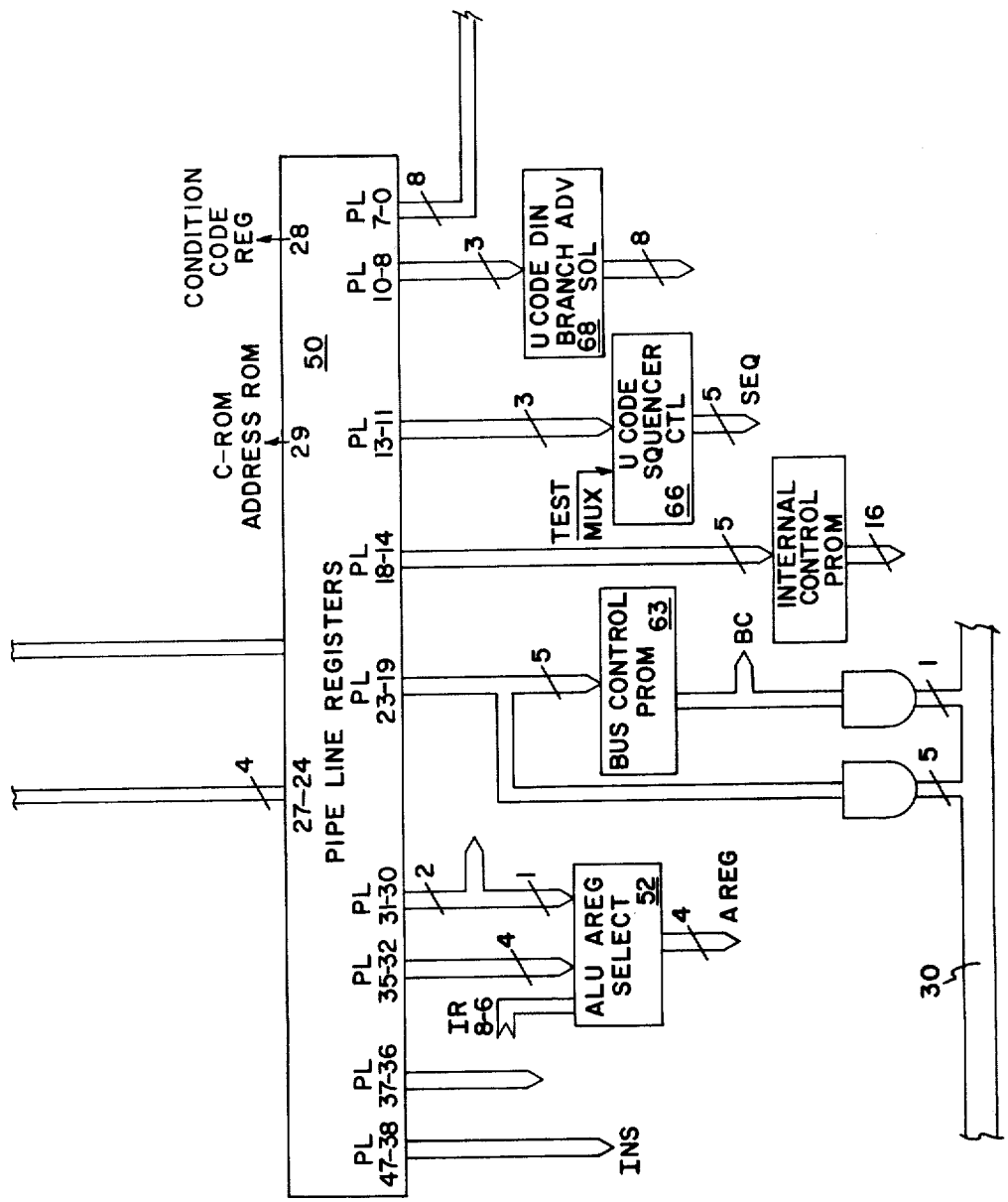

Bus Control including Bus Control Prom 63 (FIG. 5E)

This logic controls the flow of information on the system address and data busses. It controls reading/writing of main memory.

Hardware Logic Solver 74 (FIG. 5D)

This logic solves all relay nodes, resolves vertical connections and does the power in-power out bookkeeping for the logic solver operation.

The above are the major processing areas. There are several minor ones which serve to provide additional controller information for the above six areas.

There are also 16-bit internal registers. These are general purpose registers used by the arithmetic logic unit. Registers R0-R7 are also the minicode registers. There is also a single 16-bit "Q" register which is used during double register mathematical operations. The above registers are associated with the 2901 bit slice clips. In the 2911 sequence control, there is one 12-bit program counter register, four 12-bit stack location registers used during call/return/push/pop and other jump instructions, and one 12-bit register which is assumed in certain instructions. This latter register can be loaded with the contents of the next microcode address.

As shown in FIGS. 5A-5F, there are also a number of special registers used by a number of processors in the microcode machine including one 16-bit "A" bus register 65 (FIG. 5B) to load the data bus and read the 2901 arithmetic logic unit, one 24-bit "Y" bus register 98 (FIG. 5D) to buffer data from the ALU Y-bus to the data bus, one 24-bit instruction register 40 (FIG. 5D) used to contain a minicode and/or user logic instruction for decoding, one 8-bit page register 64 (FIG. 5D) used as two 4-bit page address registers. The contents of each 4-bit register is used as the most significant four bits of a 19-bit minicode address, one 8-bit "power-in" register 67 (FIG. 5F) used by the hardware logic solver to hold the "power coming in" information for the current column, one 8-bit "power-out" register 69 (FIG. 5F) used by the hardware logic solver to hold the "power coming out" information for the current column, one 24-bit holding register 58 (FIG. 5D) to hold the PRIOR contents of the Instruction Register, one 4-bit condition code register 60 (FIG. 5C) having conditions codes of CARRY, OVERFLOW, SIGN, and ZERO, one 16-bit test multiplexer (MUX) 62 (FIG. 5C), containing sixteen selectible testable bits which reflect and supply a variety of statuses concerning the programmable controller, one 16-bit link register used during logic solving for pipelining user logic instructions, (it is written from the data bus and is read by the state RAM memory address register), one 16-bit state RAM Memory Address register which contains the state RAM, one 16-bit FIFO memory address register (part of address computation block 104, FIG. 7A) containing the address of the current core memory access, one 4-bit microcode page register 70 (FIGS. 5C-5D) to select one of sixteen 256 word pages, one 16-bit "widget" register (part of address computation block 104) used in non-volatile memory interface calculations for a 24-bit user logic data base, and a 16-bit non-volatile memory address register containing current address of the non-volatile memory.

Table 2 illustrates the various functions performed by the central processing unit.

Table 3 illustrates the various "line types" and their numerical availability for the present invention.

Table 4 illustrates the various scan time options available for both the 16-bit and 24-bit data bases utilizing various memory sizes.

Memory and Busses

Main Memory

There are sixteen pages each having thirty-two thousand addresses of sixteen bit words. The memory is "word" address; that is zero, one, two, three . . . , not "byte" address.

Figure 8:
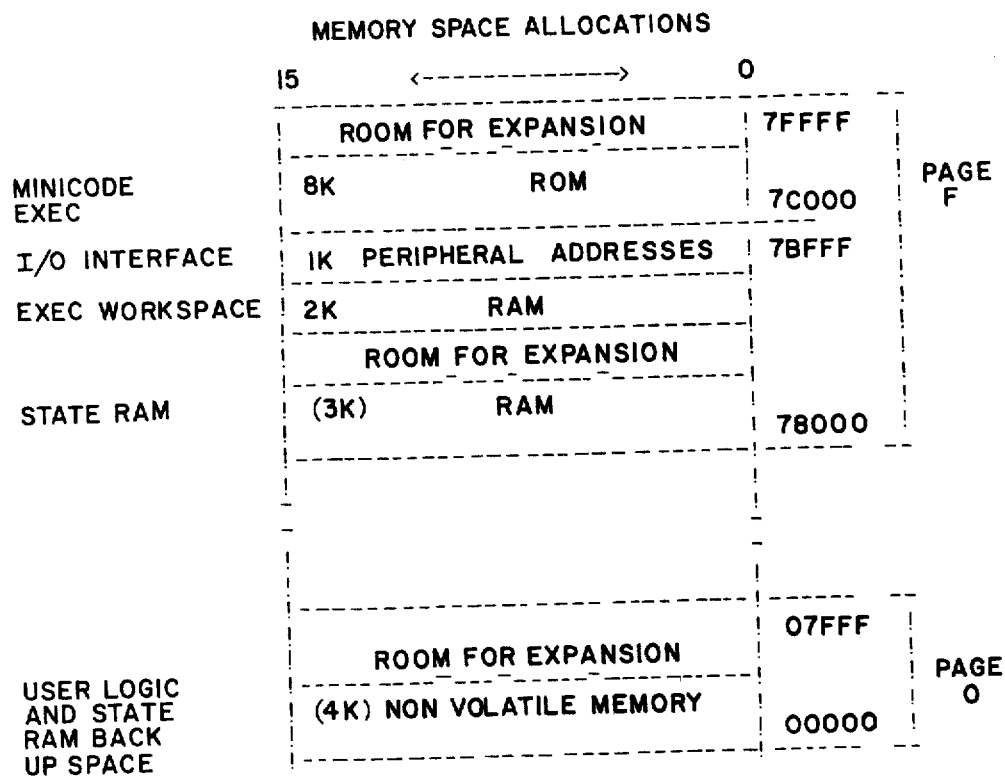
FIG. 8 is a diagram showing the memory space allocations of the programmable controller.

The maximum address space is allocated as shown in FIG. 8.

The user logic/state RAM backup non-volatile memory is used for two things; (1) the user logic data base, and (2) space for backup of coil/register data from the state RAM which must be saved upon power down.

There is a FIFO series of registers 96 (see FIG. 4), in microcode, for accessing the first thirty-two thousand words of user memory. This device reads a word from non-volatile memory at a given address, increments its address, and reads again. It holds the most recently requested sixty-four words. This is used to allow microcode to operate quickly on user logic instructions in memory and not have to wait for slow memory access. The information retrieved by the FIFO is treated as user logic. This means that information is presented as representing a 16-bit user logic data base or a 24-bit user logic data base.

Main memory is addressed, in minicode, by utilizing a 19-bit address. This address is one generated by the central processing unit using a 16-bit address word and one of two 4-bit page registers. The high order bit of the address word is used to select which page register will be used.

TABLE 2

| | CPU FUNCTIONS | | | | |
|---|---|---|---|---|---|
| CODE | FUNCTION | SOURCE* | DEST* | BASIC CPU | Enhanced CPU |
| — | Relays | 0,1 | — | x | |
| — | Timers (1.0,0.1,0.01) | direct,3,4 | 4 | x | |
| — | Counter | direct,3,4 | 4 | x | |

TABLE 2-continued

| | CPU FUNCTIONS | | | | |
|---|---|---|---|---|---|
| CODE | FUNCTION | SOURCE* | DEST* | BASIC CPU | Enhanced CPU |
| | Add | direct,3,4 | 4 | x | |
| | Subtract | direct,3,4 | 4 | x | |
| | Multiply | direct,3,4 | 4 | x | |
| | Divide | direct,3,4 | 4 | x | |
| | Skip | direct,3,4 | — | x | |
| 10xxx | Register to Table** | 0,1,3,4 | 4 | x | |
| 11xxx | Table to Register | 0,1,3,4 | 4 | x | |
| 12xxx | Table to Table | 0,1,3,4 | 4 | x | |
| 13xxx | Block Move | 0,1,3,4 | 0,4 | x | |
| 14xxx | Fifo Load | 0,1,3,4 | 4 | x | |
| 15xxx | Fifo Remove | 4 | 0,4 | x | |
| 17xxx | Get Status | — | 4 | x | |
| 20xxx | And | 0,1,3,4 | 0,4 | x | |
| 21xxx | OR/XOR | 0,1,3,4 | 0,4 | x | |
| 22xxx | Not | 0,1,3,4 | 0,4 | x | |
| 23xxx | Rotate | 0,1,3,4 | 0,4 | x | |
| 24xxx | Compare | 0,1,3,4 | 0,4 | x | |
| 25xxx | Clear Set | 3,4 | 0,4 | x | |
| 26xxx | Zeroes | 3,4 | 0,1,3,4 | x | |
| 300xx | PID | 3,4 | 4 | | x |
| 30100 | Trig | 3,4 | 4 | | x |
| 30200 | Inv-Trig | 3,4 | 4 | | x |
| 30300 | Log Funct. | 3,4 | 4 | | x |
| 30400 | Anti-log | 3,4 | 4 | | x |
| 30500 | Char. Det. | 3.4 | 4 | | x |
| 30600 | Average | 3,4 | 4 | | x |
| 30700 | Sort | 4 | 4 | | x |
| 30800 | Square Root | 3,4 | 4 | | x |
| 30900 | Standard Deviation | 3,4 | 4 | | x |
| 40xxx | Ascii out | 4 | 4 | x | |
| 41xxx | Ascii in | 3 | 4 | x | |
| 42xxx | Numeric out | 3 | 4 | x | |
| 43xxx | Numeric in | 4 | 4 | x | |

FOOTNOTE:
*0 means coil reference
1 means input reference
3 means input register reference
4 means holding or output register reference
**Table lengths are limited to 255 in the 16 bit system.

TABLE 3

| PER LINE EFFECTS ON SCAN TIMES | |
|---|---|
| LINE TYPE | NUMBER AVAILABLE |
| Relay | 9 |
| Timer (Sec & 1/10 Sec) | 15 |
| Counter | 20 |
| Calculate (B+C & B−C) | 31 |
| DX  10XX | 80 |
| 11XX | 80 |
| 12XX | 80 |
| 13XX | 80 |
| 14XX | 80 |
| 15XX | 90 |
| 16XX (w/one element in table) | 100 |
| 16XX (w/99 elements in table) | 690 |
| 17XX | 80 |
| 2001 | 60 |
| 2099 | 840 |
| 2101 | 60 |
| 2199 | 840 |
| 2201 | 60 |
| 2299 | 1240 |
| 23XX | 75 |
| 24XX | 75 |
| 2501 | 60 |
| 2599 | 840 |
| 2601 | 60 |
| 2699 | 840 |
| 2701 | 70 |
| 2799 | 1635 |
| 2801 | 70 |
| 2899 | 1635 |
| 3000 (1 × 1) | 8 |

TABLE 3-continued
PER LINE EFFECTS ON SCAN TIMES

| LINE TYPE | NUMBER AVAILABLE |
| --- | --- |
| 3000 (9999×9999) | 68 |
| 3100 (1/1) | 31 |
| 3100 (9998999/9999) | 134 |
| 3201 (1×1) | 8 |
| 3299 (9999×99) | 63 |
| 3301 (1/1) | 31 |
| 3399 (989999/99) | 134 |

TABLE 4
Memory Size/Scan Time Options
16 & 24 Bit Data Base

| MEMORY SIZE | TYPICAL CONFIGURATION | | | | | |
| --- | --- | --- | --- | --- | --- | --- |
| | 16 BIT DATA BASE | | | 24 BIT DATA BASE | | |
| | NODES | I/O | HOLDING REGISTERS | NODES | I/O | HOLDING REGISTERS |
| 4K | 2500 | 1024 | 700 | 1600 | 1024 | 700 |
| 8K | 5000 | 1024 | 1500 | 3300 | 1024 | 1500 |
| 12K | 8000 | 2048 | 1920 | 5300 | 2048 | 1920 |
| 16K | 11000 | 2048 | 1920 | 6500 | 2048 | 4000 |
| 24K | 17500 | 2048 | 1920 | 9500 | 2048 | 6000 |
| 32K | 24000 | 2048 | 1920 | 13000 | 2048 | 8000 |

NOTE:
These 6 configurations represent a sample. Other configurations can be made when I/O, registers, and nodes are traded for each other.

Figure 9:
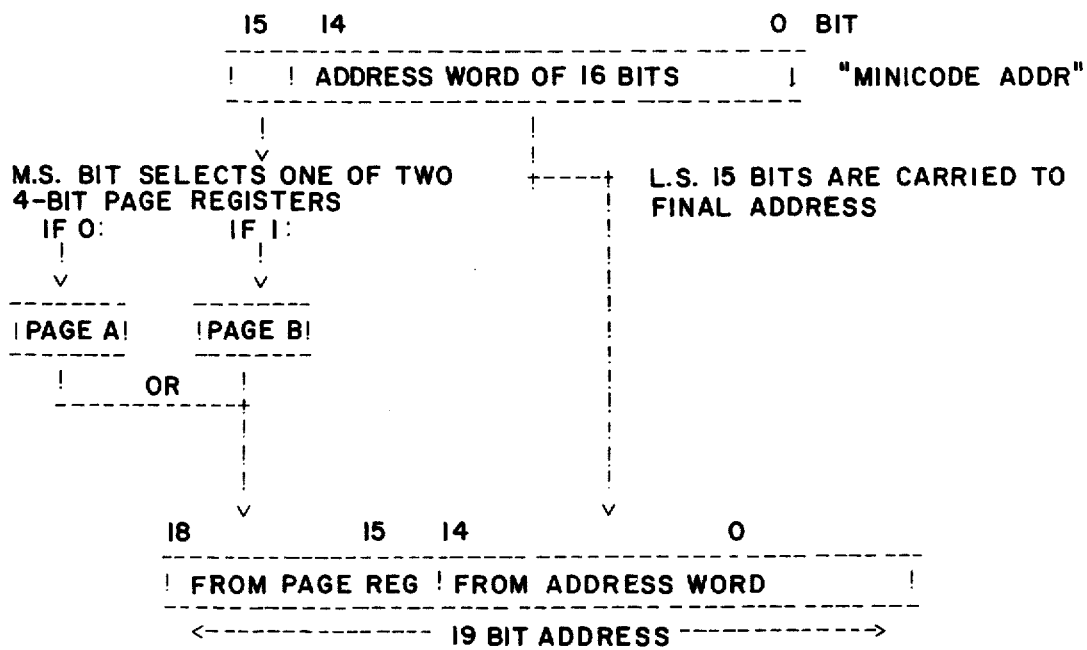
FIG. 9 is a diagram showing the page selection and address generation from a 16-bit address word.

Thus, for any address presented to the bus, the four high order bits are the contents of the page register selected by the high order bit of the address word and the fifteen low order bits are the remaining fifteen bits of the address word. A diagramatic representation of this addressing scheme is shown in FIG. 9.

Microcode Memory

The microcode memory is a 1 K to 4 K by 48-bit PROM memory (FIG. 5C) which contains the microcode instructions.

Constant ROM

The constant ROM 56 (FIG. 5B) is an area available to the microcode instructions. It is 16-bits by 256 words. It is used for bit masks and contains constants for microcode only.

Figure 6B:
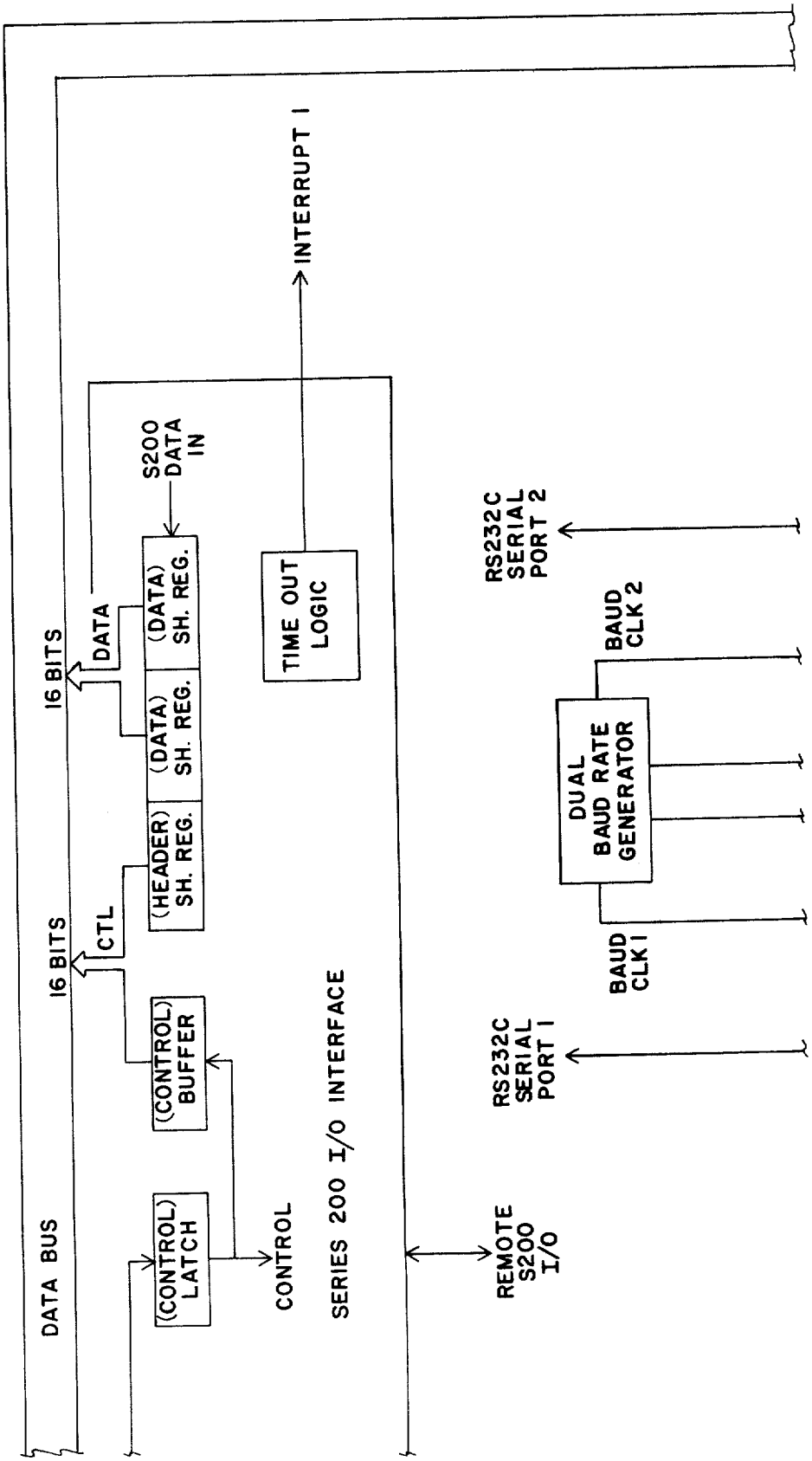

The data bus 146 of main bus 30 (see FIG. 6C) is a 24-bit wide bus and connects memory with the microcode bus registers.

Address Bus

The address bus 143 (see FIG. 6C) of the main bus 30 is 19 bits wide and is connected only to the main memory. It is loaded from the 2901 arithmetic logic unit 36 (see FIG. 5D).

Y-bus

The Y-bus 145 (FIG. 5D) is a bus from the arithmetic logic unit 36. It is 16 bits wide and carries the final results of the arithmetic logic unit operations to the rest of the microcode machine.

Arithmetic logic functions performed by the 2901 ALU are the arithmetic or logical operations performed on two 16-bit source operands and a carryin bit. The results may go to an internal 2901 register (R0-R15), a 2901 Q register and Y bus, or both an internal 2901 regiater and onto the Y bus.

The 2901 has two 1-bit shifters and can perform logical shifts on the ALU output before it is put into an internal 2901 register, and, if selected, simultaneously shift the contents of the Q register and put back into the Q register.

The hardware logic solver resolves the basic user logic instructions (relays, beginning of column, start of network) maintains column by column power in and power out information and provides a limited amount or external access and control over this information. The basic user control program is in the form of a network essentially similar to that shown in co-pending U.S. patent application Ser. No. 895,581.

The hardware logic solver functions are controlled by the following fields in the microcode word:

| | |
| --- | --- |
| ALUHLS - | 1 bit which selects the 2901 or the HLS |
| SETPWR - | 1 bit which controls the setting or a power out bit from external information |
| SOLVNODE - | 1 bit which enables the solution of a user logic instruction and the recording of the results in internal registers |
| BOC - | 1 bit which tells the HLS to resolve a beginning of column node |
| NODETYPE - | 3 bits which tell the HLS to resolve a certain relay node type |
| INITHLS - | 1 bit which tells the HLS to initialize for start of Network (solve start of Network node) |
| PWRCNTR - | 2 bits which control the power register counter which points to power bit to be read/set/cleared |
| | 1 bit which controls the shifting of the LSB out of the HLS column status register and power in register. |

Through these functions the hardware logic solver is able to solve the user network for the desired control function.

The microcode machine also includes a 2911 address sequence controller to select the address for the next microcode instruction, a test MUX, a conditional code register and interrupt control and a CPU control to control the bus registers and special purpose registers surrounding the 2901. Furthermore there is a bus controller which moves information onto the data and address busses from the CPU, makes it available to the system memory, and/or places information from memory onto either of the busses.

FIGS. 5A-5F are detailed block diagrams of the central processing unit 22. In FIGS. 5A-5F as well as in FIGS. 6A-6F and 7A-7D, the slash lines through the parallel lines designating data paths represent the number of lines or bits that are transferred in parallel along that data path. For example in FIG. 5A, the number of data lines transferred from the CPU bus 30 to the interrupt storage register 41 is eight.

Referring now to FIG. 5B, the DIN REG (D-IN register) accepts 24 inputs from the main bus 30. This data either comes from the scratchpad (described later) or from the main memory or the CMOS memory. The scratchpad is from the I/O processor and particularly that shown in FIG. 6E.

The data comes into the DIN REG from either a 16-bit data base or from a 24-bit data base. The 24-bit data base is primarily intended for user logic and comes exclusively from the CMOS memory shown in FIGS. 7A-7E. When data comes in, such as a regular minicode instruction, it branches over to the instruction register 40 (FIG. 5A) and will be put into a form containing 16 bits. From the instruction register, the data is decoded by the minicode programmable logic array (PLA) 42 (FIG. 5A). The minicode PLA transfers the microcode address sequence to a starting routine.

Depending upon the format of the instruction (e.g. a dual operand, single source operand), either the source map 44 or the destination map 46 will be called upon by the instruction to go to a particular vector point and start executing that portion of the instruction. All of the instruction sequences are resident in the microcode of the PROM 48 which is a 1-4 K by 48 bit programmable read only memory. Thus the microcode is 48 bits wide. In the microcode PROM the routines reside for the minicode instructions discussed earlier.

From the microcode PROM 48, the system is pipelined to the pipe line registers 50 shown in FIG. 5E. Out of the pipeline registers, which acts as a buffer, the 48 bits are broken up into various fields as indicated in FIG. 5E. While the instruction is being executed from the pipeline registers, the next microcode instruction is being fetched in the microcode PROM area.

Thus data fields corresponding to bits 47-38 are used for the logic solver instructions or to control the arithmetic logic unit 36 (minicode instructions). Bits 47-45 control the ALU destination field which basically states where in the ALU the results are to be placed.

Bits 44-42 define the type of operation to be performed by the ALU with the ALU responding by requesting where the data is to come from; namely, to internal registers, an external source coming in directly to the ALU 36 or coming from the Q-register, an internal register within the ALU 36.

Bit 38 basically differentiates between the performance of a logic solver instruction and a minicode-type instruction. Thus bit 38 is low for a logic instruction and is high for a minicode instruction. The above bits when bit 38 is low have a different use as explained later.

Bits 37-36 comprise the shift control. These two bits control the shift-up latch 54 and shift-down latch 53 that are attached to the side of the ALU 36. It controls the direction of a shift or a rotate or whatever it is that is being performed.

Bits 35-32 are transferred to the ALU A register select module 52. This register provides for accessing the 16 registers of the ALU 36 through the A port. Thus these four bits can select any of these 16 registers within the ALU.

Bits 31-30 can also be transferred to the ALU select register 52; that is, an instruction from memory can also address those registers within the ALU 36. Depending upon the combination of these two bits, it is determined whether or not there is an address within the ALU 36 coming from the microcode or from the minicode.

Bit 29 of the pipeline register controls the constant ROM address MUX 56. The 4-bit address can either be fed from the pipeline registers 0-3 or come from holding register 58. As noted, the holding register was previously filled with the four bits from the instruction register 40.

Bit 28 of the pipeline register loads the condition code register multiplexer 60. Thus this bit controls the loading of that register.

Bits 27-24 control (by enabling and disabling) the test multiplexer 62.

Bits 23-19 is the bus control field. This sets in motion what happens in the CMOS memory and then sets in motion what happens on what is called the I/O processor code.

Bits 18-14 are the internal CPU control fields. This field controls all the operations that go on within the CPU and their data movements. This field controls the loading of the A register (four bits which go into the microprocessor arithmetic logic unit 36, see FIG. 5D). These control bits control the enabling of the output of the constant PROM 56 into the ALU 36, control the loading of the data out bus register at the bottom of ALU 36 and control the page register 64 (FIG. 5D). It also controls the loading of the instruction register 40 (FIG. 5A) as well as the loading of the holding register 58.

Bits 13-11 of the pipeline registers 50 control the microcode address sequencer 66 (FIG. 5E) so that it can have conditional operations or expanded operations.

Bits 10-8 control the source of the direct address into the microcode sequencer. The output of the microcode branch and select module 68 controls the particular group of bits of the branch select field.

Finally, bits 7-0 define the last field of the pipeline registers. Four of the bits can be used to load the microcode page register 70. Also the entire eight bits can go into buffer 72 (FIG. 5D) to form part of the twelve bits communicating with the source and destination map 44 and 46. In addition, bits 7-4 can define the field of the B register of the microprocessor ALU 36.

As mentioned earlier, the hardware logic solver receives bits 47-37 of the pipeline register first field. The hardware logic solver 74 is shown in FIG. 5D. The function of the hardware logic solver is to solve the open and closed relays for both the horizontal position as well as to ascertain vertical flow of power in a user network. It is also used in the processing of the node-type functions selected by the user. It further defines the functions of the counter, timer and transfer functions. In essence, it takes the power in and takes the function desired and determines if there is going to be a power-out condition. It uses a coil power bit which comes from the scratchpad RAM 76 (FIG. 6E) of the I/O processor through the internal data bus 78 through a 16-1 multiplexer 80 to a latch 82 to generate the coil power signal 84.

Specifically, bit 47 enables the test multiplexer 62, output line (test MUX 86) to be lowered into the power-out register 88.

Bit 46 basically shifts register control within the hardware logic solver while the shift register is to be shifted up or down. Bit 45 indicates a beginning of a column-type node so as to take the information in the holding register and dump it into the column status register 90.

Bits 44 and 43 determine the type of node that is to be executed and whether it is to be a normally open or normally closed node or positively or negatively transitional. Bit 42 states whether or not it is a standard type node or a transitional type node. Bit 41 indicates the start of a user network which is similar to the beginning of a column so as to have power at the beginning of the operation.

Bit 40 is for the up-down counter within the logic solver so that it can be ascertained where the logic solver is with respect to a particular column in a user network. Bit 39 is used to increment the counter itself.

Bit 38 indicates the existence of a logic solver instruction while bit 37 is used as a shift register control bit within the columns of the logic solver.

Basically, the logic solver emulates the relay configuration of the user network, takes the vertical bits that are in there and moves power up and down the column automatically as well from left to right so that the execution of the user network is obtained. That is, the logic solver looks at the power in bits, the coil power bit, and determines if there is to be a bit loaded into the particular power register. After the column is completed, the vertical connection bits are processed and this combination enables the controller to know the power-in status to the next column of the user network.

As best seen in FIGS. 1 and 5D, a keyboard pad 92 comprises sixteen divisions which is able to enter hexadecimal data. This data can be loaded into the central processor arithmetic unit 36 by the user.

The central processing unit 22 further comprises a display register 92 (FIG. 5F) and a display control module 94 (FIG. 5F) which control a six digit LED display that is on the mainframe front panel.

The end result of the central processing unit as set forth in FIGS. 5A–5F is that instructions can be executed out of memory at a rate equivalent to the microcode instruction speed.

Increased computational speed is also obtained by the central processing unit 22 communicating by bus 30 with a FIFO cache memory 96 resident within the memory 24 which has a cycle time equal to that of the bus for read and write. This cycle time is 250 nanoseconds compared to the memory cycle time of 750 nanoseconds. Thus, sequential locations in memory 24 are packed into the sixty-four word deep cache memory 96 at the 750 nanosecond cycle time and are available to the CPU at the 250 nanosecond cycle time. Thus, during times when the central processing unit is executing instructions without the need for data from memory, the FIFO stack can be filled by the memory and thus be available for the CPU. This particular technique is advantageously utilized by the present invention since user logic data is stored in sequential locations of memory as earlier described and shown in FIG. 3A.

Figure 5F:
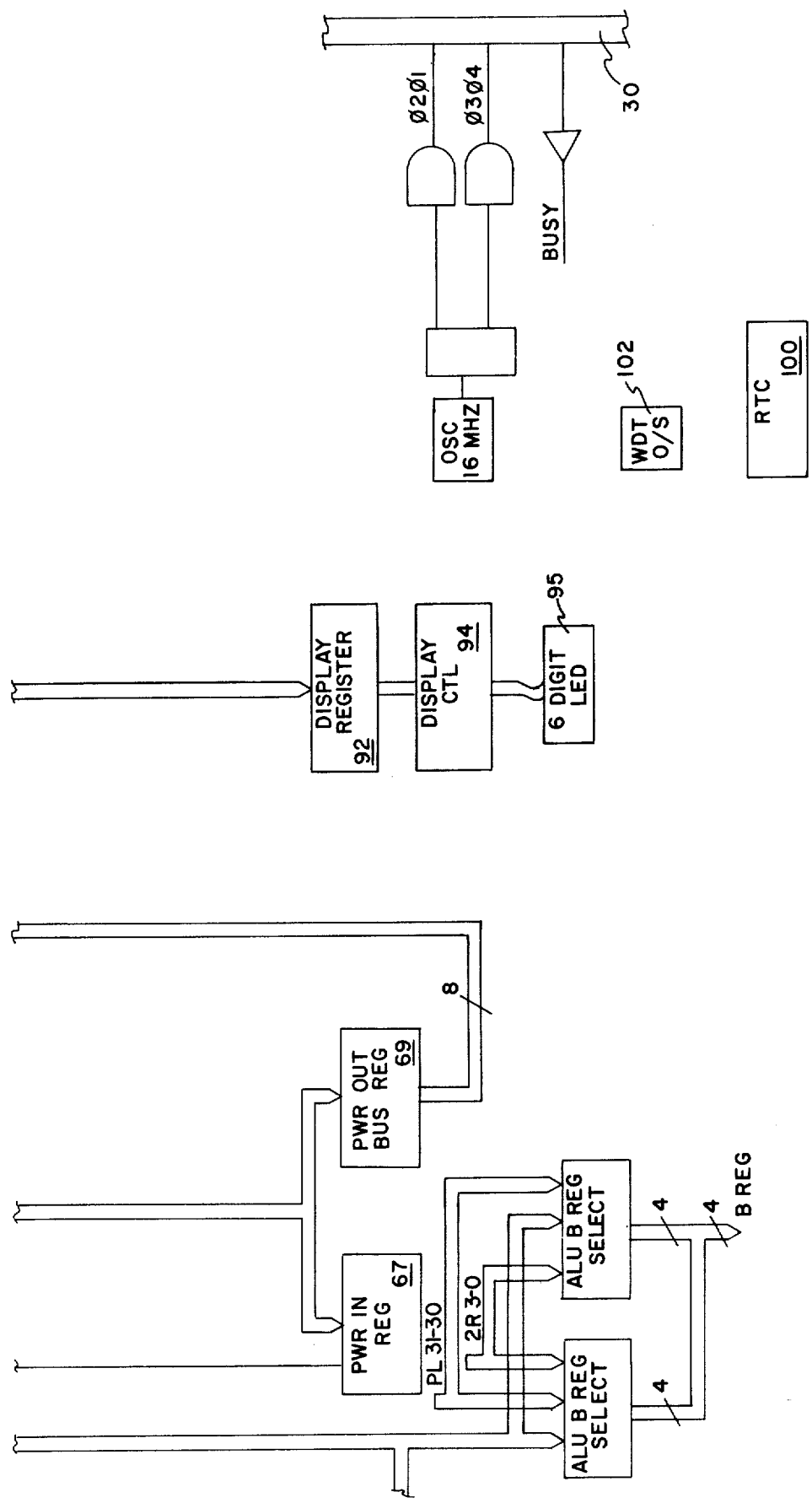

Finally data out bus register (Y) 98 (FIG. 5D) is the means by which 24 bits or 16 bits of output data can be placed on the data bus 30 if this data is to be written either into the memory or scratchpad. Also shown in FIG. 5F is a real-time clock (RTC) 100 which counts off of a main oscillator and gives a signal every ten milliseconds. There is also a watchdog timer 102 shown in FIG. 5F which indicates when too much time has been taken with respect to a particular scan.

Memory

Figure 7A:
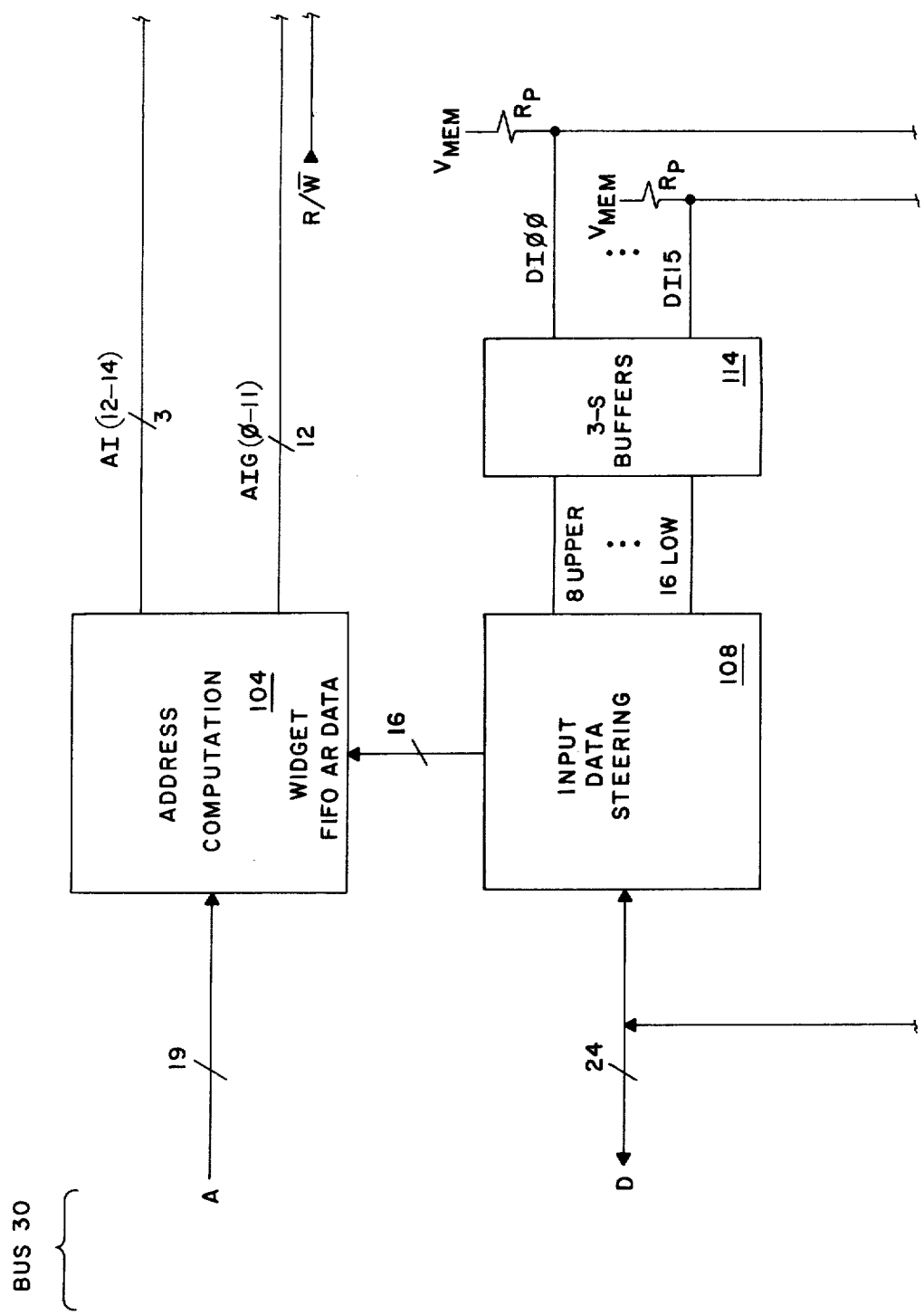
Figure 7C:
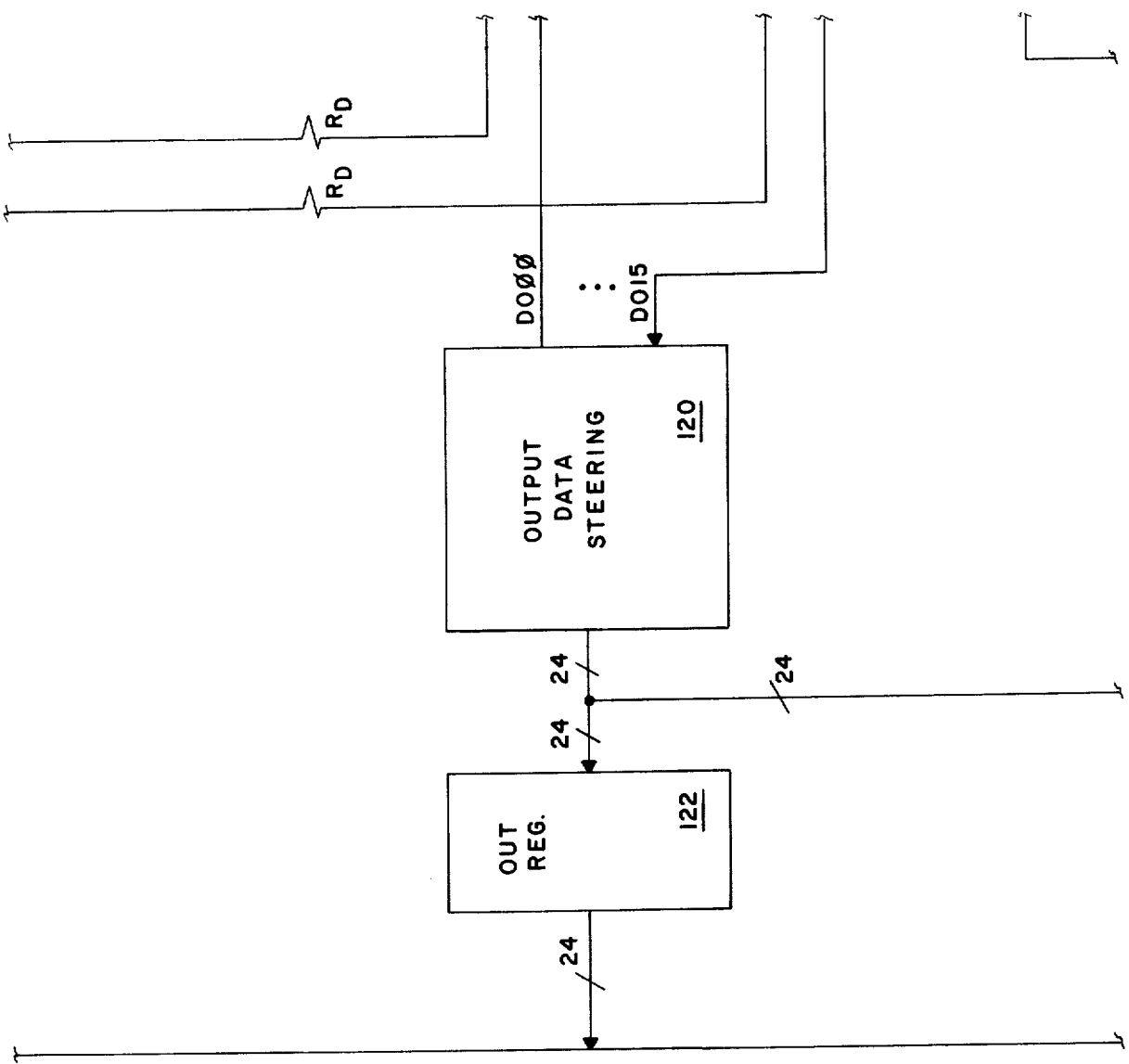

The memory associated with the CPU by bus 30 can be either a volatile memory or a non-volatile memory. A detailed block diagram of the memory when using CMOS volatile memory is shown in FIGS. 7A–7E. Instead of the 6504 CMOS chips, core memory can be utilized and this would therefore represent the configuration to be used when a non-volatile memory is used as the main memory. As shown in FIG. 7A, an address computation module 104 receives the external addresses from bus 30. There are 19 bits which enter the address computation module from the main bus 30. Several functions are performed by the address computation module, one of them is splitting the address bits which are latched onto the block into a lower 12 represented by output line AIG (0-11) and three upper bits represented by output line AI (12-14). Bits 12-14 on output AI are transferred to a chip ENABLE decode circuit 106 which decodes the three bits to determine which column of up to eight columns is to be active.

Another function of the address computation is to obtain a 24 bit operand or deposit 24 bits in a 24-bit WRITE operation. This requires two accesses to memory since the memory size is 16 bits as explained earlier. Thus one access is for the lower 16 bits of data, and one is for the upper 8 bits of data. The address of the lower 16 bits is the address that is sent in from the central processing unit. The address computation module then computes the address of the upper 8 bits by using a constant loaded into it from a "widget" register resident within the address computation block. The second address is then put on the output line during the second memory cycle to properly access the second memory location associated with the upper 8 bits of data. This corresponds to the earlier discussion as shown in FIG. 3A. The "widget" register comprises 16 bits and is loaded from an input data steering block 108 which also obtains its information from bus 30.

Figure 4:
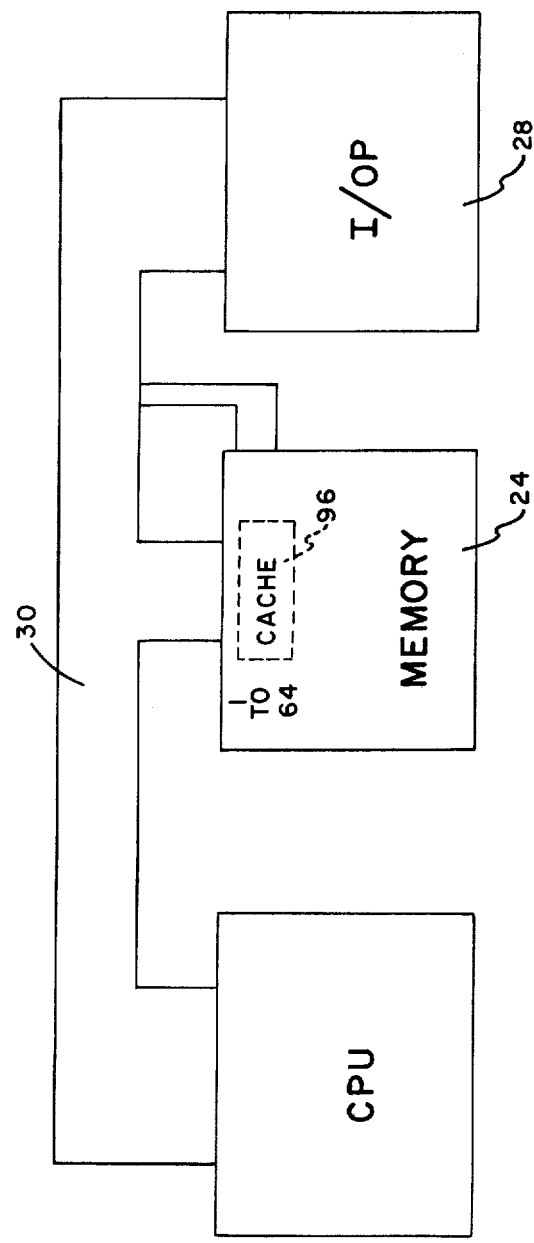
FIG. 4 is a block diagram illustrating the use of a cache memory in conjunction with the programmable controller CPU and input/output processor.

A third function of the address computation block is the computation of addresses for the FIFO cache memory 96 (see FIG. 4). The address computation block generates the FIFO address register data. This address is the address where data can be obtained from the memory chips the next time data can be retrieved by the FIFO catch memory. Thus, the control system is always attempting to keep the FIFO cache memory full, and whenever it observes on the bus 30 that the memory is not needed by the central processing unit and if there is an opening in the 64 word FIFO stack, it does a memory cycle to put data into the FIFO using the FIFO address register 110 (see FIG. 7E). The FIFO register can comprise up to 64, twenty-four bit words and has a 250 nanosecond cycle time with the bus and is thus able to increase the speed of the overall programmable controller by allowing the CPU to have faster access to memory.

Figure 7D:
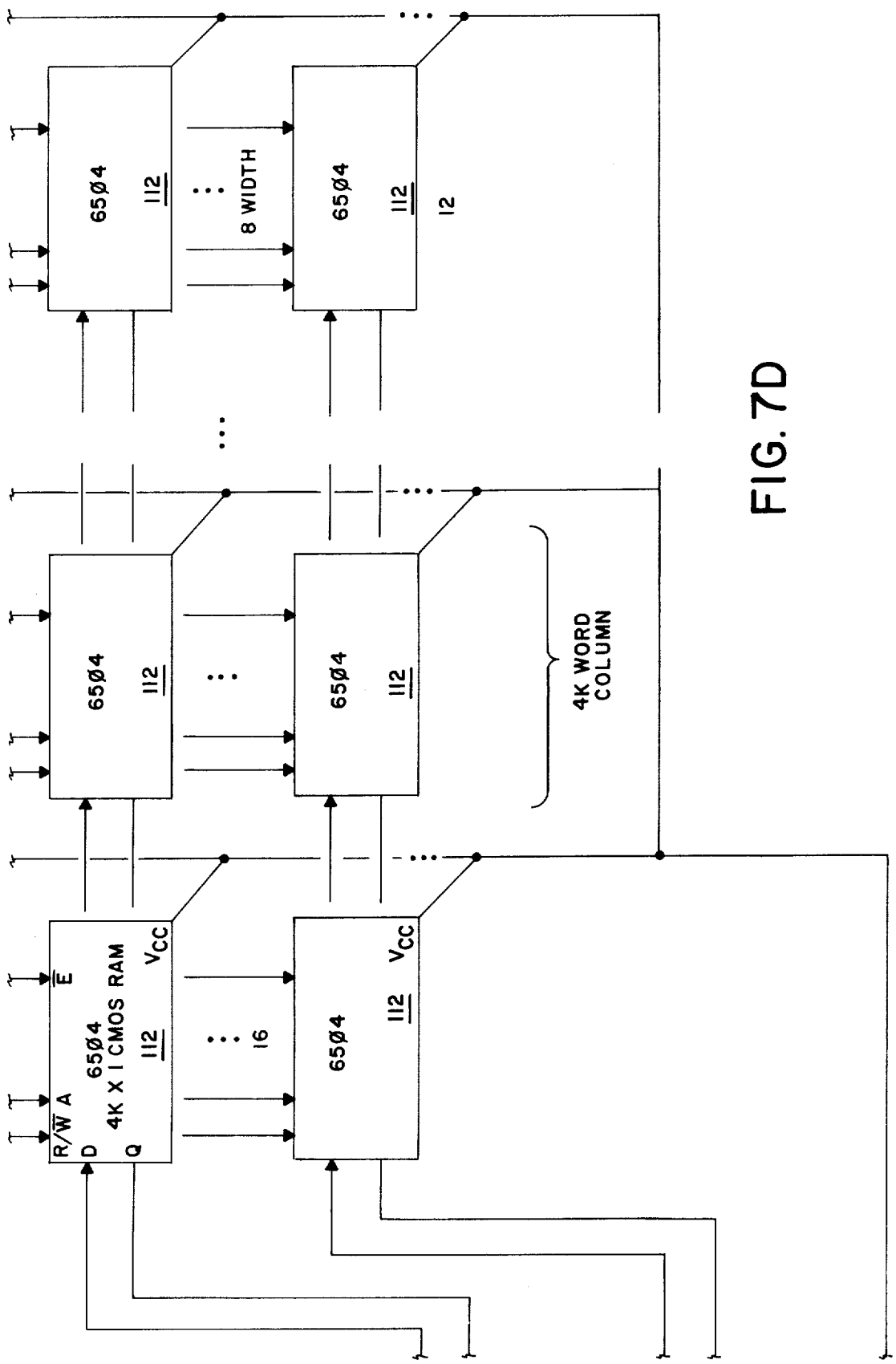

Referring again to the address computation block, it consists of a number of integrated circuit chips as well as three registers, one holding the active address, one comprising the "widget" register, and the third acting as a counting register for computing the second memory address location when a 24-bit word is to be read or written from the memory. The memory itself comprises CMOS 4K by 1 memory chips of the 6504 type. These memory chips 112 are shown in FIG. 7D. Of course, core memory can be used in place of the CMOS. There can be up to eight columns of these memory chips with 16 memory chips in each column comprising a 16-bit word.

The input data steering block 108 accepts 24 data bits from the system bus 30 and sends them to tri-state buffers (3-S buffers) 114. There are 16 lines between the input data, steering block and the tri-state buffers 14, and these 16 lines can either represent the low 16 bits of a 24-bit word or the upper 8 bits of two different 16-bit words as explained earlier and shown in FIG. 3A. The output of the tri-state buffer 114 is sent on data input lines DI/00 through DI/15 which are the 16 lines that carry data into the memory array comprising the 6504 memory chips 112. It should be noted that each column of the 6504 memory chips is 16 chips in height to represent a 16-bit data word. There can be up to eight columns of these chips from left to right as viewed in FIG. 7D.

In order to ensure the proper addressing of the memory chips, strobe gating blocks 116 (FIG. 7B) are used to ensure that the address information coming from tri-state buffers 118 have settled and therefore represent valid information.

The reading of information from the memory chips 114 is basically the same as the writing of information via the input data steering block and the address computation block. Thus the output data steering block 120 (FIG. 7C) accepts 16 output lines from the memory chips (D0 00 and D0 15) and converts them into a 24-bit output which is transferred to output register 122 which is in turn connected to the main bus 30. The addressing of the memory is again performed by the address computation block in association with the chip encode block 106, tri-state buffers 118, and strobe gating circuitry 116.

There is one additional function performed by the output data steering and that arises when only 16 bits of data actually are emanating from the memory chips for transferral as 24 bits onto the main bus 30. In some situations this arises where there are not 8 additional bits of information to be read from the memory with respect to a particular word of data. In these situations, the output data steering block also sets 8 of its output bits to 0 and thus presents a 24-bit word to the output register. In this way the outside world also views the processor as having a fixed data format although more than one format may be used depending upon the size of the programmable controller. It should be noted that the output data steering block is also associated with the FIFO registers 110 and transfers data to the FIFO registers during those times when the CPU is not requesting data from the memory and when the FIFO has room in its registers for the receipt of additional data. Thus, in the normal configuration the output data steering block receives two memory cycles representing first the lower 16 bits of data on lines D0 00 and D0 15 and then the upper 8 bits for that same word of data which is obtained from the second memory location within the memory as computed by the address computation block. The combination results in a 24-bit word being retrieved by the output data steering module for presentation to the output register and thus the system bus 30. In those situations where only 16 bits actually exist in the memory, the output data steering sets 8 of its 24-bit output lines to 0 and therefore is able to present a 24-bit word to the output register of which only 16 bits contain actual information.

Also shown in FIG. 7E is a control block 124 which provides the strobe timing outputs and steering controls and READ/WRITE instructions for the proper timing of the overall memory system. In addition, a battery detector 126 senses the output voltages of the six backup batteries which are used to keep the CMOS memories active during power outages. These batteries are necessary to refresh the CMOS memory so that the data stored therein is not destroyed during such power outages. If the battery detector senses any battery voltage as being below a predetermined amount, it causes a battery OK signal to be turned off as shown by BATT OK L output line 127.

Furthermore, in FIG. 7E a switch 128 is used to switch between power supply voltage VCC and battery voltage line 129 when the power supply voltage is below a normal operating level.

The overall result of the present memory is a memory having the capability of storing a 24-bit word in a 16-bit word memory space by using two memory cycles for storing the 24-bit word in two memory addresses, the two addresses associated to each other by a constant shift. The reading of information is also performed on a two memory cycle basis so that a 16-bit memory can output a 24-bit word to the central processing unit. There is also the capability of generating a 24-bit output even though there are only 16 bits of data representing the particular memory location. The FIFO cache memory is able to retrieve data from the main memory and is able to present it to the central processing unit on a 250 nano-second cycle time equal to that of the main bus 30 rather than the normal 750 nano-second cycle time of the main memory. This enables the central processing unit to complete the processing of information represented by the user network and other functions performed therein at a faster rate. The FIFO register is advantageously employed because the user network control program is stored in sequential memory locations allowing the data to be read by the FIFO register and presentable to the CPU in an orderly fashion. That is, the storage of data within the main memory is in a particular order for that portion of memory representing the user network and therefore the solving of user network by the CPU can also be performed in an orderly fashion by reading sequential memory loations of the main memory via the FIFO cache memory 96.

I/O Processor

The I/O processor 28 is shown in detail in FIGS. 6A-6F. This processor performs more than just input/output processing but also communicates with the central processing unit by the scratchpad RAM 76 (FIG. 6E) and the PROM executive 130 (FIG. 6E) in which the minicode executive instructions are stored.

Figure 6D:
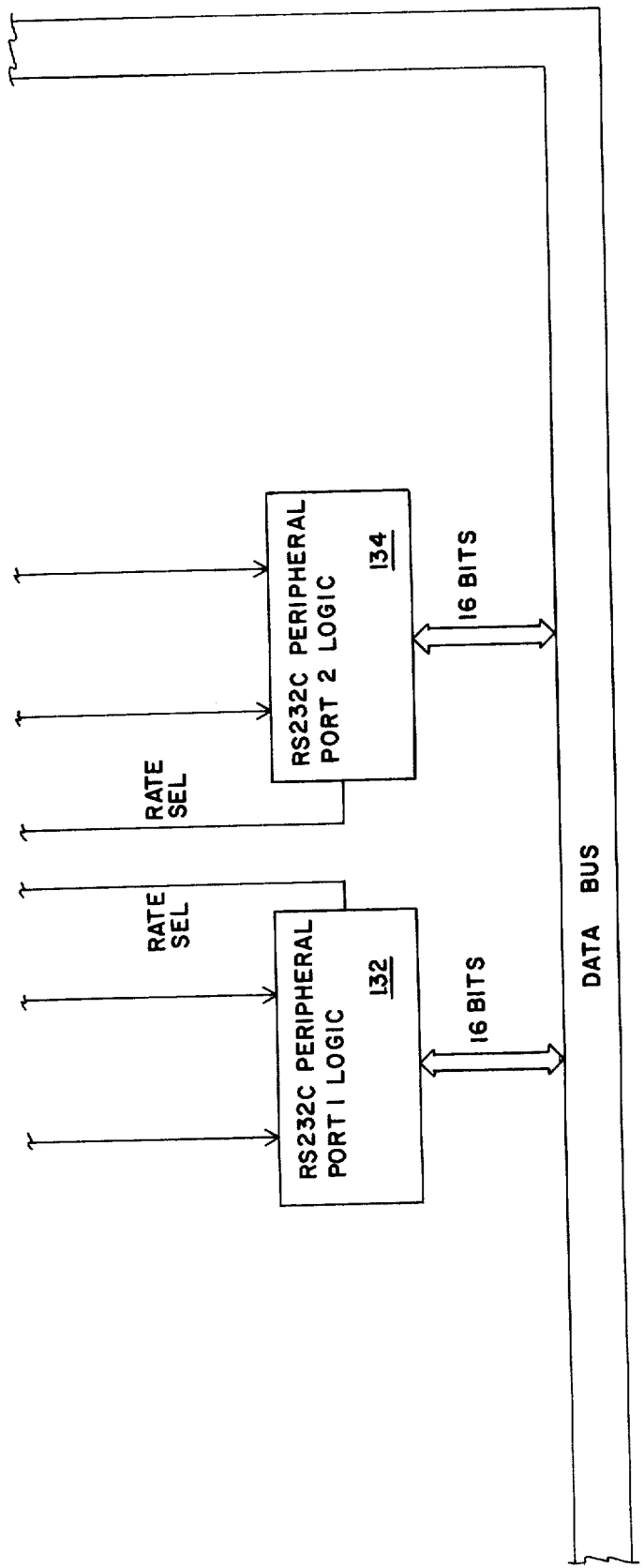
Figure 6D:
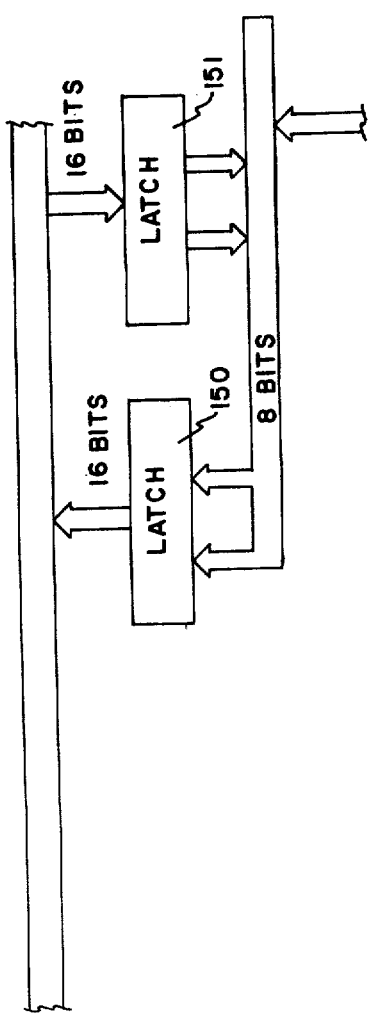
Figure 6E:
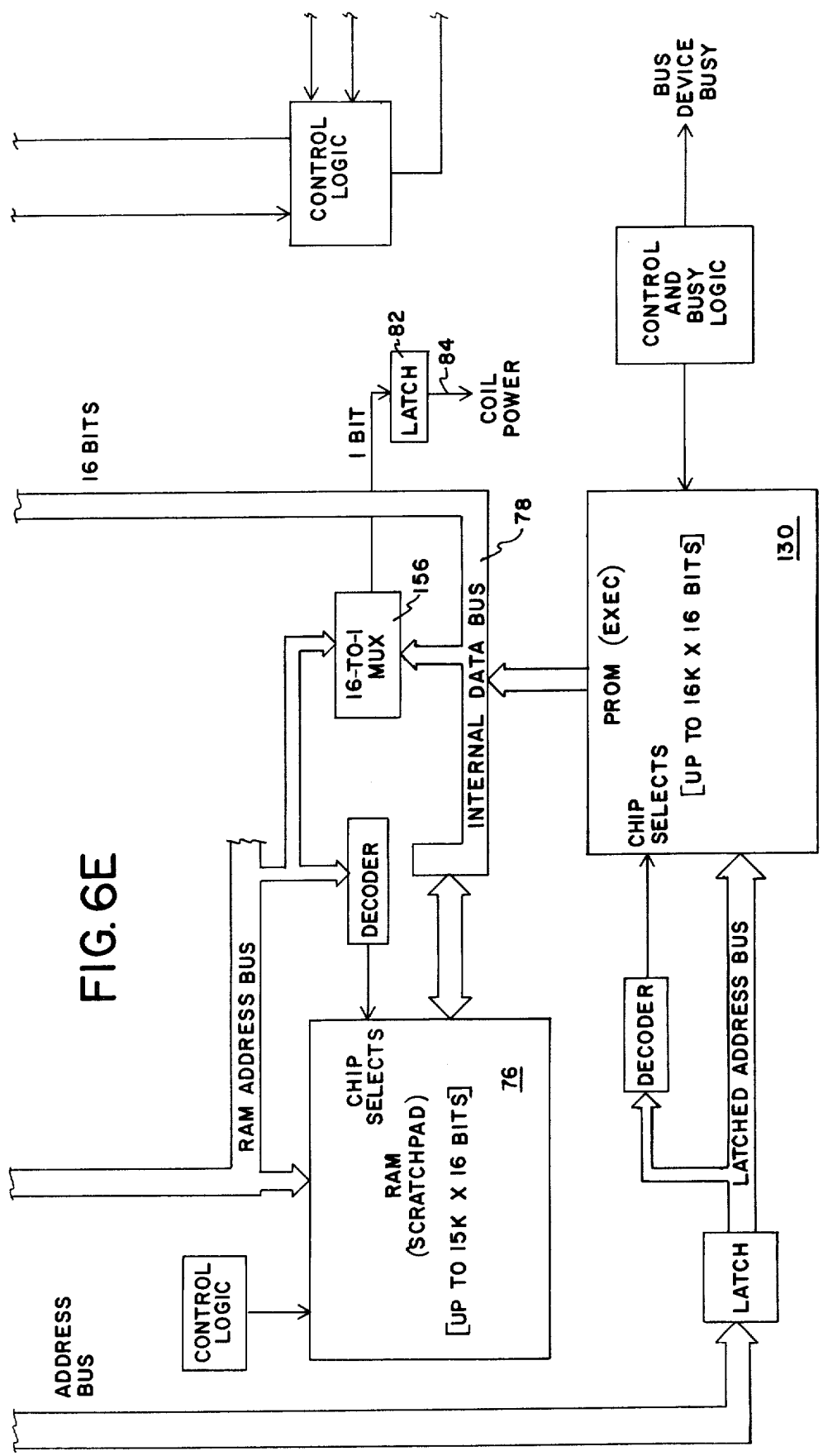

As shown in FIGS. 6D and 6E, the I/O processor can communicate on two RS 232C serial ports 1 and 2 by means of a peripheral logic port 1 module 132 and peripheral logic port 2 module 134.

The I/O processor is also able to communicate via the Gould-Modicon Series 200 I/O protocol. In this protocol, a channel of I/O consists of up to 8 input modules and up to 8 output modules with a particular message format. In essence, it is a serial data stream accompanied with a clock. One of the basic signals is data. The data signal is clocked so that the data is strobed on a particular edge of the clock. There are 23 bits of information; the first seven are control information or header information. This header includes two bits for a sync pattern for informing the processor of an incoming message. Another bit specifies to the channel whether it is communicating with an input module or an output module. Another bit specifies the first communication to the module or the second communication to the module. These communications are used in an error checking scheme. In addition, three other bits of header are used to specify one of the eight input modules or eight output modules to be communicated with.

The remaining sixteen bits of the 23-bit message contain the actual data. This Series 200 I/O data is transferred to and from the peripheral logic port 1 module 132 and the peripheral logic port 2 module 134.

Referring now to FIG. 6A, a clock timing logic module 136 receives two timing input signals (Dφ3φ4H, and Dφ4φ1H) which are 50% duty cycle signals having a 90° phase difference and a period of 250 nanoseconds each. Thus a clock edge occurs every 62.5 nanoseconds. The clock timing logic module develops any clock signal that is necessary from these four clock edges. A free-running clock output 137 and a controlled clock output 138 are generated. These clock signals can be cut off by the single-step input 139 which is a signal that can be activated by some devices external to the programmable controller in order to single-step the controller through its microcode routines. This single-step information can be used by the programmable controller user who must know the clock timing logic in order to insure that certain operations are not performed until after the end of a cycle. For instance, a scratchpad read and increment instruction should not be incremented at the beginning of a cycle. Thus, there is a distinction between the freerunning clock and the control clock for such situations.

Also shown in FIG. 6A is an address decoding control logic module 140 which receives address information from the address portion of bus 30. This address information is coded in terms of a memory mapping to control various blocks and interfaces of the I/O processor. Such controls are those directed to the Series 200 I/O read and write controls including the RS 232 port 1 read and write controls, the RS 232 port 2 read and write controls, and the ASCII read and write controls as shown in FIG. 6F. The address space with respect to the I/O processor comprises a full page of information representing 32,000 locations. In the programmable controller, there are up to sixteen pages in the complete system. The upper half of page F is devoted strictly to the PROM executive 130 directed to the minicode executive. The lower half of the page has 15,000 addresses devoted to the scratchpad RAM 76 which need not be fully populated depending upon the system configuration. In addition, there is also another 1,000 location addresses forming part of the 32,000 address of page F which is devoted to special I/O processor functions.

A 5-bit memory control bus 142 comprising part of system bus 30 communicates with instruction decode PROM's 144 so as to generate up to 32 instructions which can be decoded as microcode instructions. The output of the instruction decode PROM's thus are logic controls and information, some of which is transferred to the addressed decoding control logic module 140 for controlling the I/O's, the read and write of port 1 and port 2 peripheral logic modules, and the ASCII read and write.

A data bus 146 comprising part of the system bus 30 is used in conjunction with an internal data bus 78 (FIG. 6D) for the transfer of data to and from the I/O processor and the CPU as well as internally within the I/O processor. The internal data bus 78 is utilized to minimize the number of lines needed in the data bus 30 for the transfer of data. Latches 148 and 149 are used to interconnect the data bus 146 of the system bus 30 with the internal data bus 78. Latch 148 is used where a write operation is to be performed from the programmable controller to the internal data bus and latch 149 is for transferral of data from the internal data bus to the data bus and thus the CPU.

Also connected to the internal data bus 78 are latches 150 and 151 (FIG. 6D) which are for the transfer of data to and from the internal data bus and the ASCII data concentrator. The ASCII data concentrator is a general purpose parallel port which eight bits in width. This data concentrator can be used with devices which are both intelligent or non-intelligent and for general communication in a parallel data bus which is bi-directional. The internal data bus also communicates information from the PROM executive 130 and to and from the scratchpad RAM 76.

It should be noted that the peripheral port logic modules 132 and 134 also allow the programmable controller to communicate with other programmable controllers through a system communications protocol in addition to the RS 232C protocol. In this manner, the programmable controllers can be linked together in a system with a master and several slave programmable controllers as well as other peripheral devices for communication to and from external devices. This protocol for intercommunication between programmable controllers can utilize the ASCII mode of communication or the RTU (remote terminal unit) mode of protocol. In the ASCII mode of communication, the beginning of a new message is indicated with a colon character. The peripheral port logic module is able to decode the colon character but does not give an interrupt to the central processing unit until the first actual data character is received at which time the CPU is interrupted. In this way, the CPU is not burdened with the extra overhead of recognizing the colon character.

In the remote terminal unit mode of operation, a new message is indicated by a gap of at least three characters at the particular baud rate being communicated to and from the peripheral logic module. The first character after this gap is then considered to be a valid character which the CPU can read. Typically this would be address information.

Referring now to the scratchpad RAM 76 shown in FIG. 6E, a number of specialized functions are performed by this memory. The address presented to the scratchpad RAM comes from the RAM address counter 152 (FIG. 6C). This counter can be loaded with an address from either the address bus 143 of the system bus 30 or from one of two link registers, the "normal" link register 153 or the "swap" link register 154. These registers present addresses from the data bus 146 into the RAM address counter 152.

In addition, individual bits from the scratchpad RAM 76 can be individually accessed by the 16-1 multiplexer (MUX) 156 as shown in FIG. 6E. The output of the 16-1 MUX is a single bit which is in turn transmitted to a latch 82 for representing coil power output on line 84. This coil power is actually the status information in terms of a particular bit of information stored in the scratchpad RAM which relates back to an individual input or output of the programmable controller. It thus represents the status of an external input such as a switch, motor or some other device, or a particular output to such a device.

Finally, the scratchpad RAM is used for a number of specialized functions involved in the overall optimization of the programmable controller system. It has special purpose instructions resident therein; for instance, addresses can be incremented or addresses can come from other places such as the data bus for a particular specialized instruction.

In summary, the overall I/O processor 28 provides for both the communication with external devices and the rest of the programmable controller as well as being the residence area for specialized memories, the scratchpad RAM and executive PROM which are utilized by the central processing unit to complete the overall operation of the programmable controller system.

Thus what has been described is an improved programmable controller having the ability to utilize two different data bases. The programmable controller utilizes pipeline processing and hardware solution of the user control program. A memory management scheme is provided for direct addressability of up to ½ million words by utilization of page registering as well as the utilization of an input/output processor for communication in both serial and parallel format. The overall programmable controller is able to achieve relay replacement of standard control programs while maintaining a rapid execution time for scanning the user control program.

It will thus be seen that the objects set forth above, among those made apparent from the preceding description, are efficiently attained and, since certain changes may be made in carrying out the above construction without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described the invention, what is claimed is:

1. An improved programmable controller of the type having a central processing unit (CPU), an addressable memory having more than $1.5 \times N$ addressable memory locations, each memory location capable of storing P data bits, where P is an integer greater than one, an input/output (I/O) system, a bus interconnecting the CPU, memory and I/O, and wherein the programmable controller is able to store user logic defining a control program for execution by the programmable controller wherein the user logic may comprise up to N possible nodes, where N is a positive integer, wherein the improvement comprises:

(A) first means, interconnected to the bus and forming part of the memory, for storing up to N data words representing the user nodes, each data word comprising up to $1.5 \times P$ bits of data so that for each data word "i", where i=1, ..., N, up to P data bits are stored in memory location "j" of the addressable memory, where J=base address (base addR)+i−1, and so that the remaining data bits of the data word "i", if any, are stored in up to half the memory space of memory location "k" of the addressable memory, where K=(j/2)+"widget", where "widget"=((base addR)/2)+N, and where the remainder of j/2 determines which half of addressable memory location "k" to use to store the remaining data bits of data word "i", and (B) second means, interconnected to the bus and forming part of the memory, for reading the data words from the addressable memory so that for any data word "i" data is read from addressable memory location "j" and combined with the data bits corresponding to data word "i" stored in addressable memory location "k", wherein this means further increases the length of data word "i" to equal $1.5 \times P$ bits, when the data word "i" has less than $1.5 \times P$ significant data bits, by further combining non-data significant bits to the data significant bits read from addressable memory locations "j" and "k" so as to equal $1.5 \times P$ bits; whereby all data words N are stored and packed in the addressable memory in the same manner regardless of the number of data bits in any given data word, and wherein these data words are stored in the addressable memory beginning at an address defined by the base address so that a flexible address boundary is realized between the addressable memory locations for non-user node storage and that utilized for user logic node storage.

2. An improved programmable controller as defined in claim 1, wherein the means for storing up to N data words in two different addressable memory locations "j" and "k" comprises a designated register for storing the widget value.

3. An improved programmable controller as defined in claim 1 or 2, wherein P equals 16 and wherein the data words comprise either 16 or 24 bits each, whereby the data format communicated with the outside world is 24 bits and whereby 16 bit and 24 bit data words are storable in the addressable memory.

4. An improved programmable controller as defined in claim 1, wherein the addressable memory further comprises a FIFO memory connected to the second means, wherein the output of the FIFO memory contains data words representing relay or non-relay elements, each element resident in a unique node of a network of nodes comprising the user logic, the nodes arranged in lines whose logical output is represented by the state of a coil, each relay type element conditioned by the state of a referenced coil, and wherein the bus transfers these data words from the FIFO memory to both the CPU and the I/O system, and wherein the CPU comprises means, interconnected to the bus for determining from the data word the contact type of each node representing a relay element, and wherein the I/O system comprises means interconnected to the bus for using the same data word to simultaneously determine the state of the coil referenced by the relay element in the data word; whereby a single data word represents different information to different portions of the programmable controller for their simultaneous execution.

5. An improved programmable controller as defined in claim 4, wherein the bus comprises a data bus portion and wherein the I/O system means for simultaneously determining the state of the referenced coil comprises a link register connected to the data bus portion of the bus for receipt of the data word from the FIFO memory, a random access memory (RAM) address counter connected to the output of the link register for determining the address of the referenced coil, a random access memory (RAM) connected to the output of the RAM address counter for storing the states of the coils, and means connected to the output of the RAM for transferring the referenced coil state to the CPU.

6. An improved programmable controller as defined in claim 5, wherein the CPU means for determining the contact type of each relay type element represented by a data word comprises a data in register connected to the bus for receipt of data words from the FIFO memory, an instruction register connected to the output of the data in register, a node map, a minicode programmable logic array, a source map, a destination map, and a holding register each connected to the instruction register, a column status register connected to the holding register for representing the status of a user network column, a microcode address sequencer connected to the output of the node map, minicode programmable logic array, source map and destination map, a microcode PROM connected to the output of the microcode address sequencer, and pipeline registers connected to the output of the microcode PROM; whereby the simultaneous execution of both the CPU means for determining the contact type of each relay type element and the I/O system means for determining the state of the referenced coil are achieved using pipeline techniques.

7. An improved programmable controller as defined in claim 6, wherein the CPU further comprises a logic solver communicating with the output of the CPU means for determining the contact type of each relay type element and also communicating with the output of the I/O system means for determining the state of the referenced coil, the logic solver logically combining the information from the CPU means and I/O processor means so as to determine the logical output of the node.

8. An improved programmable controller as defined in claim 1, wherein the memory has memory management means interconnected to the bus for storing data in a multi-page format, each page providing for the direct addressability of R addressable locations, where R is an integer equal to the number of binary permutations of a second integer S equal to the number of bits in a data word.

9. An improved programmable controller as defined in claim 1, wherein the I/O system comprises third means for handling input/output tasks with interconnected devices as those tasks logically occur during the solving of the user logic.

* * * * *

UNITED STATES PATENT AND TRADEMARK OFFICE
CERTIFICATE OF CORRECTION

PATENT NO. : 4,307,447
DATED : December 22, 1981
INVENTOR(S) : Salvatore R. Provanzano et al It is certified that error appears in the above-identified patent and that said Letters Patent are hereby corrected as shown below:

Column 4, line 57 - delete the word "addreses" and substitute therefor -- address --.

Column 5, line 31 - delete the phrase "a 'traps'" and substitute therefor -- as "traps" --.

Column 5, line 35 - delete the word "port" and substitute therefor -- ports --.

Column 6, line 8 - after the phrase "PC 9" add -- ( --.

Column 7, line 44 - delete the word "BMJ" and substitute therefor -- BMI --.

Column 8, line 57 - delete the phrase "Note affected" and substitute therefor -- not affected --.

Column 12, line 66 - delete "and".

Column 29, line 55 - delete "-1".

Signed and Sealed this

Twenty-eighth Day of January 1986

[SEAL]

Attest:

DONALD J. QUIGG

Attesting Officer    Commissioner of Patents and Trademarks